United States Patent
Cohen et al.

(10) Patent No.: US 8,055,648 B2
(45) Date of Patent: Nov. 8, 2011

(54) MANAGING INFORMATION RELATED TO COMMUNICATION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

(*) Notice: Subject to any disclaimer, the term of this patent is extended or adjusted under 35 U.S.C. 154(b) by 224 days.

(21) Appl. No.: 11/729,313

(22) Filed: Mar. 27, 2007

(65) Prior Publication Data
US 2008/0189266 A1    Aug. 7, 2008

Related U.S. Application Data

(63) Continuation-in-part of application No. 11/702,012, filed on Feb. 1, 2007.

(51) Int. Cl.
*G06F 17/30* (2006.01)
(52) U.S. Cl. .......... 707/713; 707/723; 707/770
(58) Field of Classification Search .......... 707/4, 5, 707/104.1, 713, 723, 912, 770, 802, 803; 704/260; 706/45; 345/156
See application file for complete search history.

(56) References Cited

U.S. PATENT DOCUMENTS

| | | | |
|---|---|---|---|
| 4,914,590 A * | 4/1990 | Loatman et al. ........... 704/8 |
| 4,965,763 A | 10/1990 | Zamora | |
| 5,542,089 A | 7/1996 | Lindsay et al. | |
| 5,694,523 A * | 12/1997 | Wical ........... 706/45 |
| 5,732,395 A * | 3/1998 | Alexander Silverman ... 704/260 |
| 5,963,940 A * | 10/1999 | Liddy et al. ........... 707/723 |
| 6,026,409 A * | 2/2000 | Blumenthal ........... 707/104.1 |
| 6,363,377 B1 * | 3/2002 | Kravets et al. ........... 707/4 |
| 6,570,555 B1 * | 5/2003 | Prevost et al. ........... 345/156 |
| 6,816,858 B1 * | 11/2004 | Coden et al. ........... 707/750 |
| 7,088,949 B2 | 8/2006 | Burnstein et al. | |
| 7,502,730 B2 * | 3/2009 | Wang ........... 704/9 |
| 7,542,971 B2 * | 6/2009 | Thione et al. ........... 707/749 |
| 2005/0091038 A1 * | 4/2005 | Yi et al. ........... 704/10 |
| 2007/0282867 A1 * | 12/2007 | McAllister et al. ........... 707/100 |
| 2008/0229056 A1 | 9/2008 | Agarwal et al. | |

OTHER PUBLICATIONS

"Business/Industry"; G2ALERT: Emergency Notification and Information Gathering System; bearing a date of 2007; pp. 1-2; dockside.net Inc.; located at http://www.g2alert.com/markets_bus.asp; printed on Jan. 29, 2007.

"Education"; G2ALERT: Emergency Notification and Information Gathering System; bearing a date of 2007; pp. 1-2; dockside.net Inc.; located at http://www.g2alert.com/markets_edu.asp; printed on Jan. 29, 2007.

(Continued)

*Primary Examiner* — Shahid Alam

(57) ABSTRACT

In one aspect, a method related to receiving, retrieving and presenting information. In addition, other method, system, and program product aspects are described in the claims, drawings, and/or text forming a part of the present disclosure.

27 Claims, 10 Drawing Sheets

OTHER PUBLICATIONS

"Features—SMART Makes Internet Marketing Easy"; SMART Internet Marketing; pp. 1-4; located at http://www.smartinternetmarketing.com/email-marketing-advertising-features.asp; printed on Jan. 29, 2007.

"Government"; G2ALERT: Emergency Notification and Information Gathering System; bearing a date of 2007; pp. 1-3; dockside.net Inc.; located at http://www.g2alert.com/markets_gov.asp; printed on Jan. 29, 2007.

"Healthcare"; G2ALERT: Emergency Notification and Information Gathering System; bearing a date of 2007; pp. 1-2; dockside.net Inc.; located at http://www.g2alert.com/markets_health.asp; printed on Jan. 29, 2007.

"SMART eMail—Communicate More Efficiently"; SMART Internet Marketing; pp. 1-2; located at http://www.smartinternetmarketing.com/opt-in-email-advertising.asp; printed on Jan. 29, 2007.

"SMART Links—Measure Your Marketing Effectiveness"; SMART Internet Marketing; p. 1; located at http://www.smartinternetmarketing.com/email-marketing-links.asp; printed Jan. 29, 2007.

"SMART Survey—Understand Your Customer's Needs"; SMART Internet Marketing; pp. 1-2; located at http://www.smartinternetmarketing.com/online-survey.asp; printed on Jan. 29, 2007.

"SMART Sweepstakes—Attract Customers & Prospects"; SMART Internet Marketing; p. 1; located at http://www.smartinternetmarketing.com/opt-in-email-sweepstakes.asp; printed on Jan. 29, 2007.

"The burden is on your shoulders"; G2ALERT: Emergency Notification and Information Gathering System; bearing a date of 2007; dockside.net Inc.; located at http://www.g2alert.com/index.asp; printed on Jan. 29, 2007.

* cited by examiner

FIG. 4A

Key To FIG. 4
| 4A | 4B |

300 receiving identifying information, wherein the identifying information is included in a discourse 400 — receiving the identifying information, wherein the identifying information is included in the discourse, and wherein the identifying information identifies at least a portion of a topic 402 — receiving the identifying information, wherein the identifying information is included in the discourse, and wherein the identifying information includes a spoken word 404 — receiving the identifying information, wherein the identifying information is included in the discourse, and wherein the identifying information includes a photograph 406 — receiving the identifying information, wherein the identifying information is included in the discourse, and wherein the identifying information includes a video segment and/or a video frame 408 — receiving the identifying information, wherein the identifying information is included in the discourse, and wherein the identifying information includes a graphic item

FIG. 5A

| 5A | 5B |

Key To
FIG. 5

302 — searching for complementary information, wherein the complementary information includes information that is associated and/or provisionally associated with the identifying information

500 searching for the complementary information, wherein the complementary information is associated and/or provisionally associated with the identifying information, and wherein the searching includes receiving the complementary information

502 searching for the complementary information, wherein the complementary information includes information that is associated and/or provisionally associated with the identifying information, and wherein the searching includes searching a private resource

504 searching for the complementary information, wherein the complementary information includes information that is associated and/or provisionally associated with the identifying information, and wherein the searching includes searching a public resource

506 searching for the complementary information, wherein the complementary information includes information that is associated and/or provisionally associated with the identifying information, and wherein the complementary information includes a spoken word

508 searching for the complementary information, wherein the complementary information includes information that is associated and/or provisionally associated with the identifying information, and wherein the complementary information includes a photograph (A)   (B)

FIG. 5B

Key To FIG. 5
| 5A | 5B |

510 searching for the complementary information, wherein the complementary information includes information that is associated and/or provisionally associated with the identifying information, and wherein the complementary information includes a video segment and/or a video frame 512 searching for the complementary information, wherein the complementary information includes information that is associated and/or provisionally associated with the identifying information, and wherein the complementary information includes a graphic item 514 searching for the complementary information, wherein the complementary information includes information that is associated and/or provisionally associated with the identifying information, and wherein the complementary information includes a textual item 516 searching for the complementary information, wherein the complementary information includes information that is associated and/or provisionally associated with the identifying information, and wherein the complementary information includes a data set

302

A

B

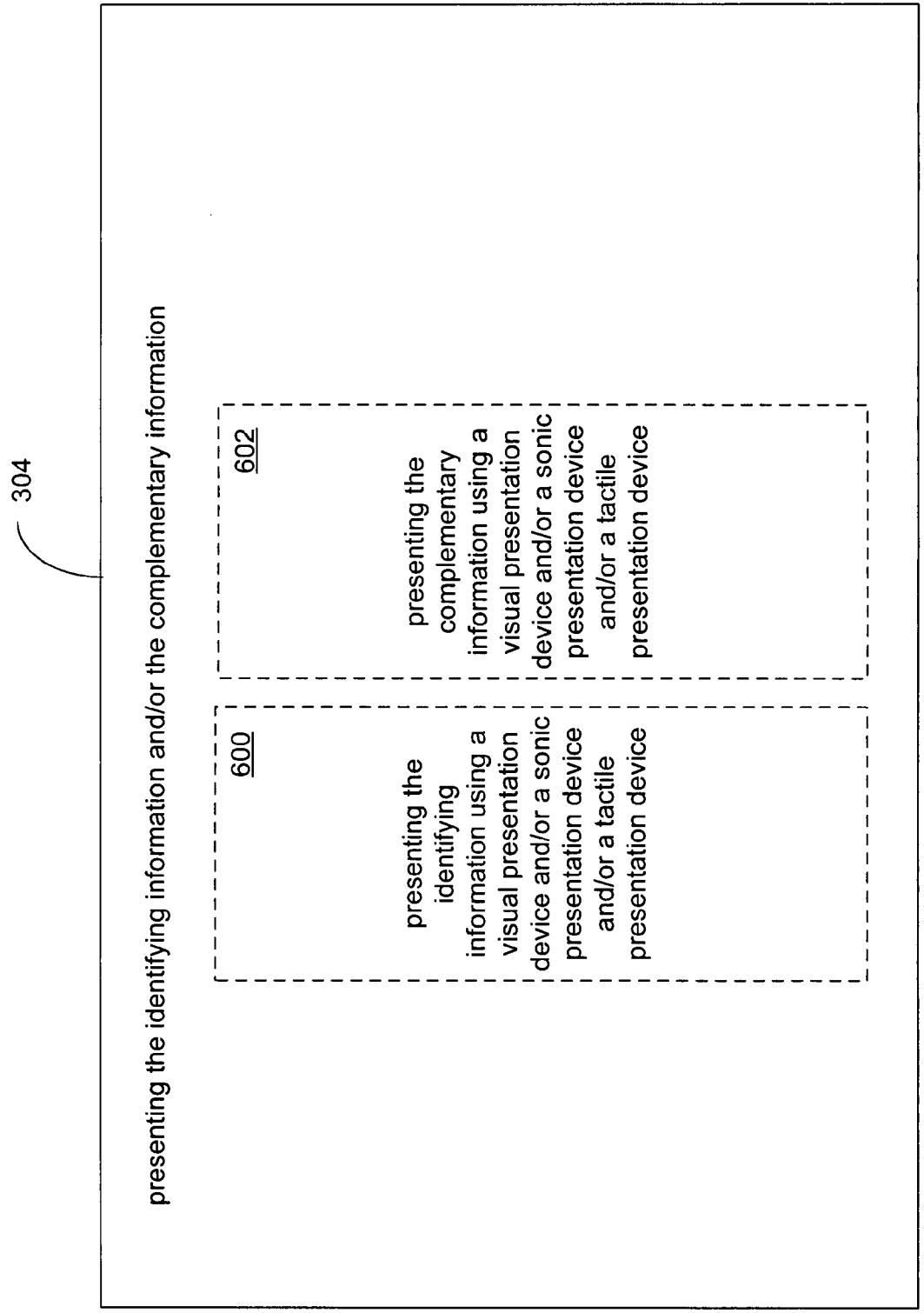

MANAGING INFORMATION RELATED TO COMMUNICATION

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATION

For purposes of the USPTO extra-statutory requirements, the present application constitutes a continuation-in-part of U.S. patent application Ser. No. 11/702,012, entitled Component Information and Auxiliary Information Related to Information Management, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene, as inventors, filed 1 Feb. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates, in general, to information management.

SUMMARY

In one aspect, a method related to information management includes but is not limited to receiving identifying information, wherein the identifying information is included in a discourse; searching for complementary information, wherein the complementary information includes information associated and/or provisionally associated with the identifying information; and presenting the identifying information and/or the complementary information. In addition to the foregoing, other method aspects are described in the claims, drawings, and text forming a part of the present disclosure.

In one aspect, a method related to information management includes but is not limited to receiving identifying information, wherein the identifying information is included in a discourse; searching for complementary information, wherein the complementary information includes information that is associated and/or provisionally associated with the identifying information; and storing the identifying information and/or the complementary information in a data template. In addition to the foregoing, other method aspects are described in the claims, drawings, and text forming a part of the present disclosure.

In one aspect, a system related to information management includes but is not limited to circuitry for receiving identifying information, wherein the identifying information is included in a discourse; circuitry for searching for complementary information, wherein the complementary information includes information associated and/or provisionally associated with the identifying information; and circuitry for presenting the identifying information and/or the complementary information. In addition to the foregoing, other system aspects are described in the claims, drawings, and text forming a part of the present disclosure.

In one aspect, a system related to information management includes but is not limited to circuitry for receiving identifying information, wherein the identifying information is included in a discourse; circuitry for searching for complementary information, wherein the complementary information includes information that is associated and/or provisionally associated with the identifying information; and circuitry for storing the identifying information and/or the complementary information in a data template. In addition to the foregoing, other system aspects are described in the claims, drawings, and text forming a part of the present disclosure.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product related to information management includes but is not limited to a signal bearing medium bearing one or more instructions for receiving identifying information, wherein the identifying information is included in a discourse; one or more instructions for searching for complementary information, wherein the complementary information includes information associated and/or provisionally associated with the identifying information; and one or more instructions for presenting the identifying information and/or the complementary information. In addition to the foregoing, other program product aspects are described in the claims, drawings, and text forming a part of the present disclosure.

In one aspect, a program product related to information management includes but is not limited to a signal bearing medium bearing one or more instructions for receiving identifying information, wherein the identifying information is included in a discourse; one or more instructions for searching for complementary information, wherein the complementary information includes information that is associated and/or provisionally associated with the identifying information; and one or more instructions for storing the identifying information and/or the complementary information in a data template. In addition to the foregoing, other program product aspects are described in the claims, drawings, and text forming a part of the present disclosure.

In addition to the foregoing, various other method, system, and/or program product aspects are set forth and described in the teachings such as the text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

FIG. 5 illustrates several alternative implementations of the high-level logic flowchart of FIG. 3;

FIG. 6 shows several alternative implementations of the high-level logic flowchart of FIG. 3;

The use of the same symbols in different drawings typically indicates similar or identical items.

DETAILED DESCRIPTION

Figure 1:
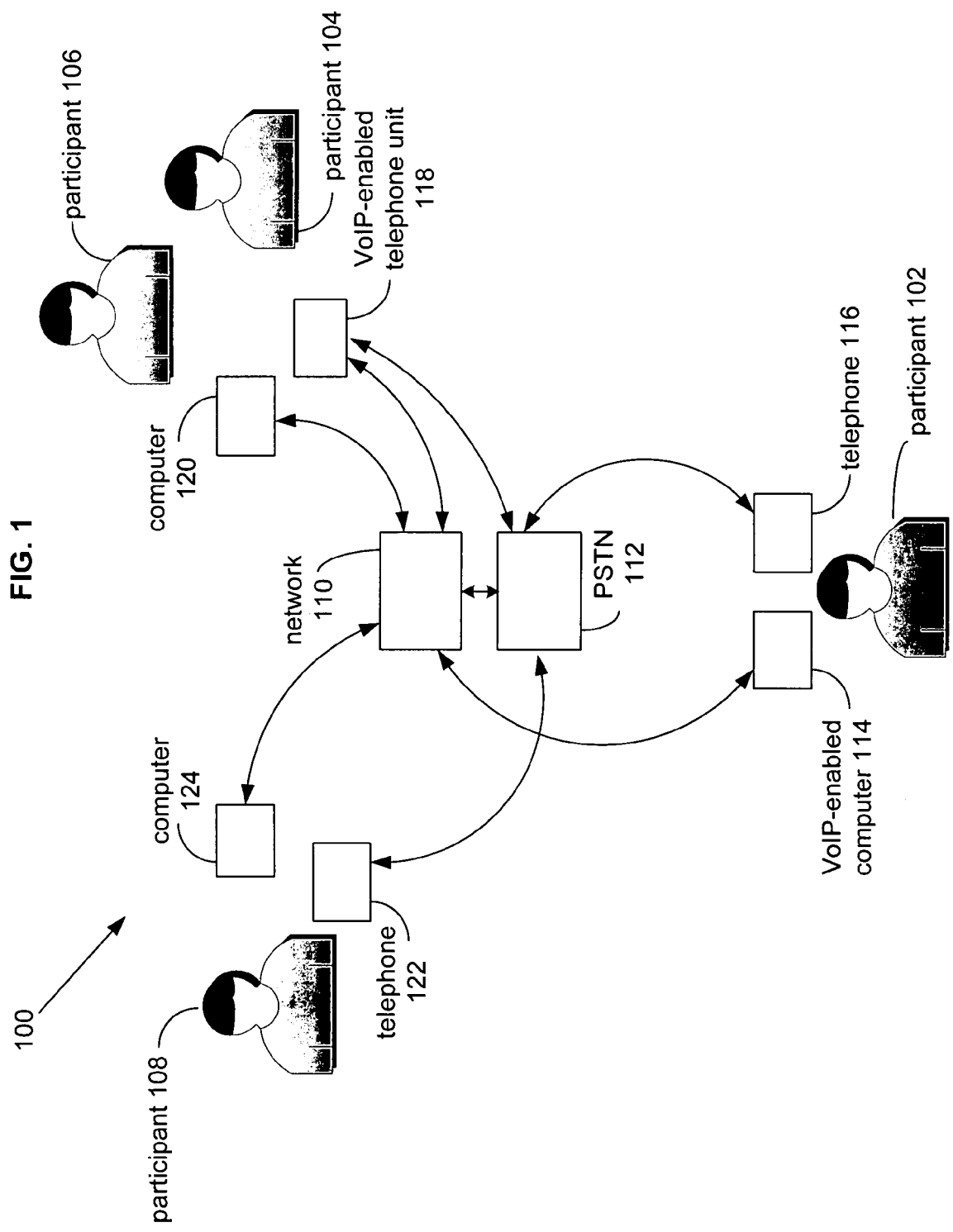
FIG. 1 depicts an exemplary environment in which the methods and systems herein may be represented.

FIG. 1 depicts an exemplary environment in which the methods and systems herein may be represented. The exemplary environment 100 shows four representative participants, participant 102, participant 104, participant 106, and participant 108, participating in a discourse taking place over a Voice-over-Internet-Protocol (herein, "VoIP") equipment and components of the internet, represented by the network 110 and/or over a public switched telephone network (herein, "PSTN"), represented by the PSTN 112. Participants in a discourse may include persons and/or software agents acting, e.g., on behalf of a person or persons and/or autonomously. As used herein, a "discourse" may include but not be limited to two-or-more-way communication among two or more participants (such as participants 102, 104, 106, and/or 108) (e.g., a give-and-take of questions and answers among the various participants) and/or one-way communication from one or more participants at one location and/or using one set of communications equipment (such as participants 104 and 106) to one or more participants participating in a discourse (e.g., a presentation by one or more participants 104 and/or 106 to the other participants 102 and 108). The participants 102, 104, 106 and/or 108 are representative of any number of participants in discourses possible in the exemplary environment 100.

In the exemplary environment 100, the participant 102 may use a VoIP-enabled computer 114 that is operably coupled to the network 110 and/or a telephone 116 operably coupled to the PSTN 112 to participate in the conversation. The VoIP-enabled computer 114 and/or a similar computer may be configured to send and receive electronic mail (herein, "email"), instant messages and/or text messages and may be configured to present visual and/or sonic and/or tactile information, e.g., pictures, graphics, voices, sounds, and/or vibrations (such as vibrating an object to signal an incoming communication).

In the exemplary environment 100, the participants 104 and/or 106 may use a VoIP-enabled telephone unit 118 operably coupled to the network 110 and/or the PSTN 112 and/or a computer 120 which may be operably coupled to the network 110 and configured to send and receive email, instant messages and/or text messages and which may be configured to present visual and/or sonic and/or tactile information, e.g., pictures, graphics, voices, sounds, and/or vibrations (such as vibrating an object to signal an incoming communication).

In the exemplary environment 100, the participant 108 may use a telephone 122 operably connected to the PSTN 112 and the computer 124 which may be operably coupled to the network 110, which may be configured to send and receive email, instant messages and/or text messages and which may be configured to present visual and/or sonic and/or tactile information, e.g., pictures, graphics, voices, sounds, and/or vibrations (such as vibrating an object to signal an incoming communication).

Specific items of hardware and/or software and/or firmware (herein, "hardware/software/firmware") may be associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124.

In the exemplary environment 100, the participants may participate together in a discourse in which any of the participants 102, 104, 106, and/or 108 may use each of the items of equipment associated with them herein to communicate in a discourse with any or all of the other participants 102, 104, 106, and/or 108, where the discourse may include but not be limited to identifying information which may include but not be limited to a spoken word (such as a name) and/or a photograph (such as a digital still image of a mountain) and/or a video segment (such as a 10-second digital video segment of a moving truck) and/or video frame (such as a digital video still image of a person from a video segment) and/or a graphic item (such as an image of a company logo) and/or a textual item (such as a word in an email or a document file) and/or a data set (such as a bookkeeping spreadsheet). The identifying information may identify a topic, for example, a person and/or a location and/or an object.

Herein, complementary information may include but not be limited to information that is associated and/or provisionally associated with the identifying information. For example, complementary information may include not be limited to a spoken word (such as an address) and/or a photograph (such as a digital still image of a building) and/or a video segment (such as a 10-second digital video segment of a movie) and/or video frame (such as a digital video still image of a vehicle from a video segment) and/or a graphic item (such as an image of a charcoal sketch) and/or a textual item (such as a word in an email or a document file) and/or a data set (such as a set of poll results). One or more of the participants 102, 104, 106, and/or 108 may direct hardware/software/firmware to search for complementary information that is associated and/or provisionally associated with the identifying information. For example, the participant 102 may direct the hardware/software/firmware of the VoIP-enabled computer 114 to search for complementary information associated with and/or provisionally associated with a topic identified as "hood," where the word "hood" is spoken in a discourse in the exemplary environment 100. In this example, the participant 102 may receive a list of results (e.g., "hood" as a detected topic might result in a list setting forth "Mt. Hood," "a hooded sweatshirt," "a criminal," and/or a "neighborhood," and the participant 102 would select from the list the result most appropriate to the actual topic, and thereafter the system's presented results would improve in that user selection from the presented list resolved the provisional association.

A search for complementary information associated with and/or provisionally associated with identifying information may be conducted in information stored in storage resources that are associated with one or more private resources, such as storage resources associated with one or more of the participants 102, 104, 106, and/or 108 (e.g., an in-house database), and/or in storage resources associated with one or more third parties (e.g., a commercial database accessible by fee), and/or in one or more public storage resources (e.g., a database or stored document accessible by the public without limitation, such as a weblog).

Information including but not limited to identifying information and/or complementary information may be presented using presentation features of the VoIP-enabled computer 114 and/or the telephone 116 and/or the VoIP-enabled telephone unit 118 and/or the computer 120 and/or the telephone 122 and/or the computer 124, including but not limited to a visual presentation feature (e.g., a computer screen) and/or a sonic presentation feature (e.g., a speaker) and/or a tactile presentation feature (e.g., a device shaker).

Information included but not limited to identifying information and/or complementary information may be stored to populate a data template, e.g., a graphic field on computer screen such as the VoIP-enabled computer 114, where the graphic field is associated with the participant 108, such that the graphic field is used to present information about participant 108 to participant 102.

Figure 2:
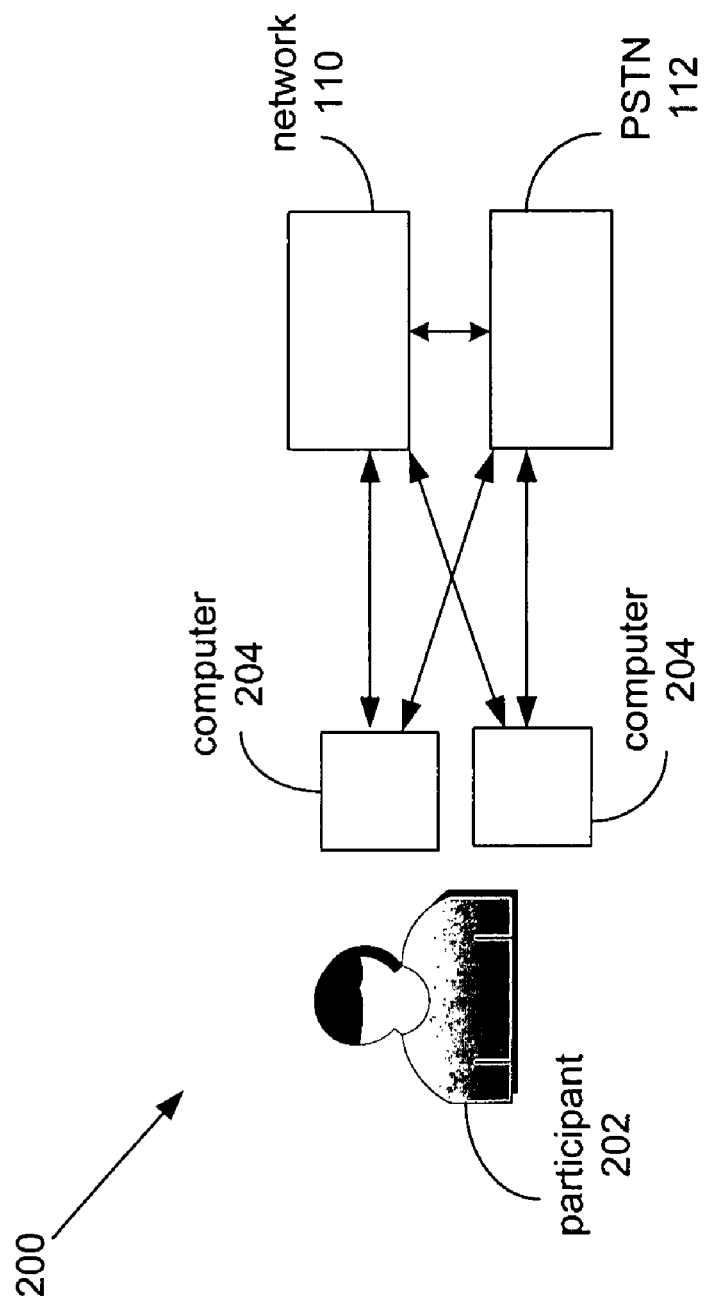
FIG. 2 shows an exemplary environment in which the methods and systems herein may be represented.

FIG. 2 shows an exemplary environment in which the methods and systems herein may be represented. In the exemplary environment 200, the single person or a single group of two or more people (both the single person and the single group being represented by the participant 202) may use one or more computers 204 to receive identifying information and/or to search for complementary information having to do with a discourse comprising a monologue of the single person represented by the participant 202 or from a discourse comprising a dialogue among the group of people represented by the participant 202, and/or to present the identifying information and/or complementary information. The one or more computers 204 may be operably coupled to the network 110 and/or the PSTN 112.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3:
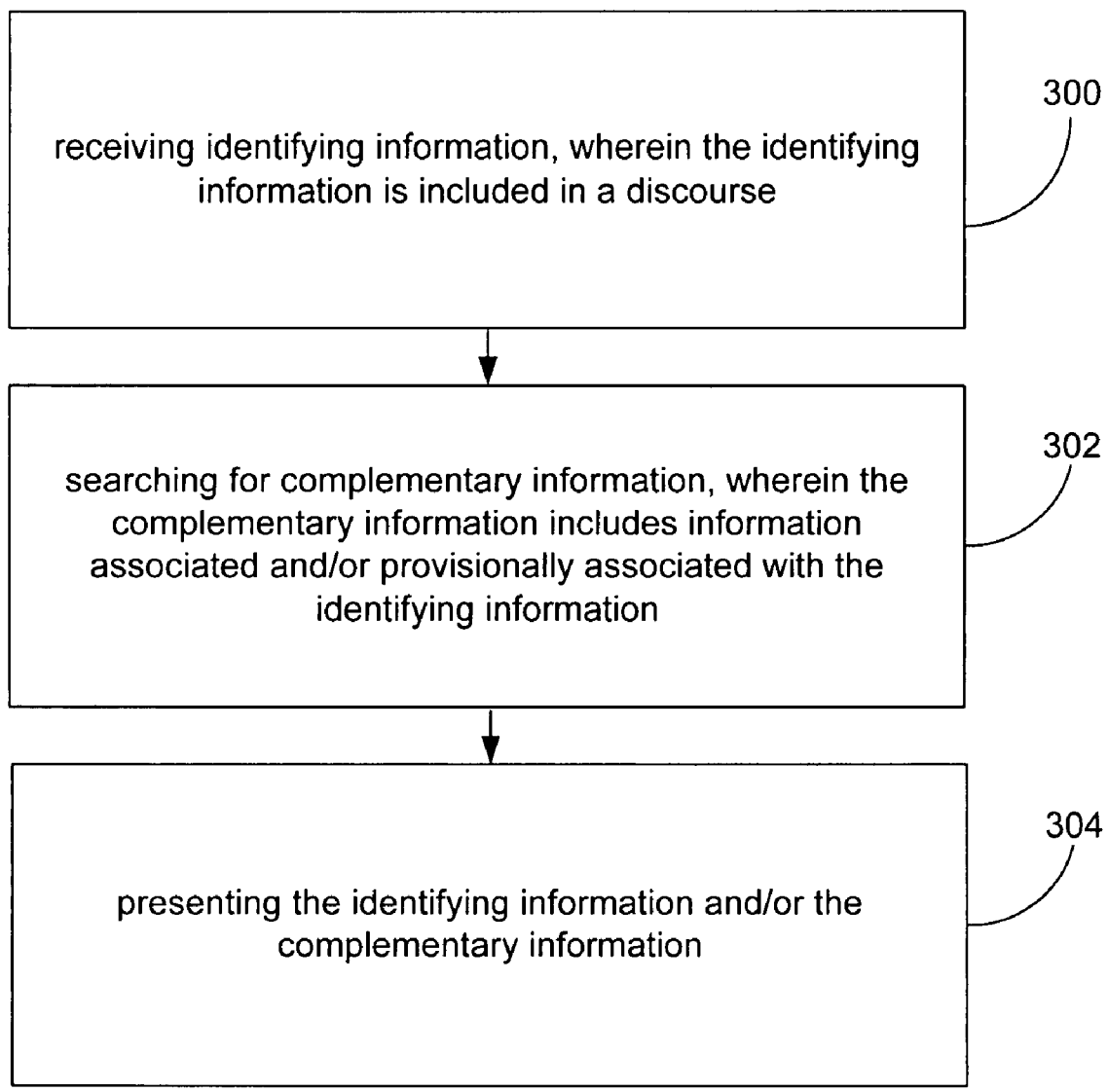
FIG. 3 illustrates a high-level logic flowchart of an operational process.

FIG. 3 illustrates a high-level logic flowchart of an operational process. The operational process depicted may include on or more of the following operations: 300, 302, and/or 304.

Operation 300 depicts receiving identifying information, wherein the identifying information is included in a discourse. Operation 300 may include, for instance, receiving identifying information, wherein the identifying information is included in a discourse, where the identifying information may include but not be limited to a spoken word (such as a name of a company) and/or a photograph (such as a digital still image of a person) and/or a video segment (such as a 10-second digital video segment of a movie) and/or video frame (such as a digital video still image of a vehicle from a video segment) and/or a graphic item (such as an image of a map) and/or a textual item (such as a word in an email or a document file) and/or a data set (such as temperature record over time). Further, the identifying information may identify a topic, for example, a person and/or a location and/or an object.

In the context of the exemplary environment 100, operation 300 may include, for example, receiving identifying information, wherein the identifying information is included in a discourse, where, in a discourse in which participants 102 and/or 104 and/or 106 and/or 108 are participating, the VoIP-enabled computer 114 associated with the participant 102 may receive the identifying information, and/or the VoIP-enabled telephone unit 118 associated with the participants 104 and/or 106 may receive the identifying information, and/or the telephone 122 associated with the participant 108 may receive the identifying information. In one specific example of the operation 300, during a conference call participant 104 directs computer 120 to transmit to participant 102, through VoIP-enabled computer 114, an audio data stream including the spoken name "Jennifer Jones" (a specific example of the more general "identifying information"). Upon receipt of the identifying information by VoIP-enabled computer 114, participant 102 indicates to VoIP-enabled computer 114 through some means (e.g., a voice and/or graphical user interface) that participant 102 is interested in any additional information that VoIP-enabled computer 114 could supply regarding "Jennifer Jones."

The receiving of operation 300 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 302 shows searching for complementary information, wherein the complementary information includes information associated and/or provisionally associated with the identifying information. Operation 302 may include, for example, searching for complementary information, wherein the complementary information includes information associated and/or provisionally associated with the identifying information, where the complementary information may include but not be limited to a spoken word (such as an client name) and/or a photograph (such as a digital still image of an accident site) and/or a video segment (such as a 10-second digital video segment of a movie) and/or video frame (such as a digital video still image of a vehicle from a video segment) and/or a graphic item (such as an image of a line drawing) and/or a textual item (such as a word in an email or a document file) and/or a data set (such as a set of growth measurements).

In the context of the exemplary environment 100, operation 302 may include, for example, searching for complementary information, wherein the complementary information includes information associated and/or provisionally associated with the identifying information. In one example of the operation 302, and continuing the foregoing specific example of operation 300, in one specific example of searching for information associated with the name of the person spoken in the audio data stream (e.g., "Jennifer Jones"), VoIP-enabled computer 114 searches for data indexed by the name of "Jennifer Jones." The results of this search might be a still digital image indexed by the name "Jennifer Jones." In one specific example of searching for information provisionally associated with the name "Jennifer Jones," VoIP-enabled computer 114 searches for data having an attenuated/diluted/noisy linkage with the name "Jennifer Jones." For instance, VoIP-enabled computer 114 might search for data having some content and/or indexing at least partially formed by the name "Jennifer Jones." As an example of content, VoIP-enabled computer 114 might search a data store of articles having some content associated with the name "Jennifer Jones" (e.g., a digital still image in an article in which Jennifer Jones's name is mentioned in the caption for the digital still image). As an example of data having some indexing at least partially formed by the name "Jennifer Jones," VoIP-enabled computer 114 might search a data store of images having respective indices such as "Jennifer Jones of Dallas," "Jennifer Jones of Paris," "Jennifer Jones of London," etc.

The searching of operation 302 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 304 illustrates presenting the identifying information and/or the complementary information. Operation 304 may include, for instance, presenting the identifying information and/or the complementary information, where the presenting may be performed with presentation features of the VoIP-enabled computer 114 and/or the telephone 116 and/or the VoIP-enabled telephone unit 118 and/or the computer 120 and/or the telephone 122 and/or the computer 124 and/or one or more of the computers 204 including but not limited to a visual presentation feature (e.g., a computer screen) and/or a sonic presentation feature (e.g., a speaker) and/or a tactile presentation feature (e.g., a device shaker).

In the context of the exemplary environment 100, operation 304 may include, for example, presenting the identifying information and/or the complementary information. In one example of operation 304, and continuing with the foregoing specific example of operation 302, in one specific example of presenting the identifying information and/or the complementary information, more information may be needed to more confidently associate the complementary information with the identifying information. To associate more confidently the complementary information with the identifying information, VoIP-enabled computer 114 may prompt for input of additional information from, e.g., a participant 102 and/or may correlate more than one search and/or search result to narrow a range of provisional associations. Continuing with the operation 302 example describing content associated with the name "Jennifer Jones" as an example of "provisionally associated" (e.g., the digital still image in the article in which Jennifer Jones's name is mentioned in the caption for the digital still image), in one implementation VoIP-enabled computer 114 may pair the image from the article with the spoken name from the audio data stream and query participant 102, "Is this her?" (e.g., through a graphical user interface), to which participant 102 may respond as appropriate (e.g., "yes," "no" "to a confidence of 90%," etc.). Thereafter, VoIP-enabled computer 114 will be able to use participant 102's answers in subsequent searching thereby ensuring more accuracy. Continuing with the operation 302 example describing data having some indexing at least partially formed by the name "Jennifer Jones," VoIP-enabled computer 114 may present a listing of digital still images from which participant 102 may select that most appropriate to the name "Jennifer Jones" of the document file.

In addition, the presenting the identifying information and/or the complementary information of operation 304 may include, in one specific example, the VoIP-enabled computer 114 presenting via, e.g., a monitor and/or a speaker, the identifying information, e.g., the spoken name "Jennifer Jones," and/or the complementary information, e.g., one or more digital still images returned by the searching of the specific example of operation 302.

The presenting of operation 304 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 3, the following specific examples pertain to operations 300, 302, and 304 in the context of exemplary environment 200 (illustrated in FIG. 2).

In one specific example, the operation 300 may include receiving identifying information, wherein the identifying information is included in a discourse, and one or more of the computers 204 may receive the identifying information. Participant 202 participates in a discourse including a conference call, via one or more of the computers 204, in which participant 202 provides information to one or more recipients who receive information only and do not provide information to participant 202 (e.g., a presentation by participant 202 to one or more other silent participants). In this example, one or more of the computers 204 receive from participant 202 input via various devices identifying information including, e.g., a data stream including the speech of participant 202 including a spoken name such as "John Wayne," and a data stream including a digital still image of "John Wayne." Upon receipt by one or more of the computers 204, the participant 202 indicates to one or more of the computers 204 through some means (e.g., a voice and/or graphical user interface) that participant 202 is interested in any addition information that one or more of the computers 204 could supply regarding the person named "John Wayne" using the identifying information for, e.g., archiving, current and/or future reference, and/or provision for present and future audiences of the discourse.

Continuing the foregoing example of the operation 300 in the context of exemplary environment 200, operation 302 may include searching for complementary information, wherein the complementary information includes information associated and/or provisionally associated with the identifying information, and one or more of the computers 204 may search for the complementary information. In one specific example of searching for the complementary information associated with the identifying information, one or more of the computers 204 search for data that matches the spoken name "John Wayne" and the digital still image of "John Wayne." As an example of content, computer 204 might search a data store of names, of biographical information indexed by the name or names of the subject of the biographical information, and of digital still images indexed by the name or names of the people pictured in the stored digital still images for matches with the identifying information and might retrieve instances of biographical information indexed by the name "John Wayne" and digital still images indexed by the name "John Wayne."

In one specific example of searching for information provisionally associated with the spoken name "John Wayne" and the digital still image of "John Wayne," one or more of the computers 204 retrieve information having an attenuated/diluted/noisy linkage with the spoken name "John Wayne" and the digital still image of "John Wayne." For example, one or more of the computers 204 might search a data store of names, of instances of biographical information indexed in part with the name or names of the subjects of the biographical information, and of stored digital still images indexed in part with the name or names of the people pictured in the digital still images. As an example of data having such an attenuated/diluted/noisy linkage with the spoken name "John Wayne" and the digital still image of "John Wayne," one or more of the computers 204 might search data stores having instances of biographical information and digital still images with indices such as "John Wayne, third grade student at Nash Elementary," "John Wayne, star of the motion picture 'Stagecoach,'" "John Wayne, certified public accountant," etc.

Continuing the foregoing examples of the operations 300 and 302 in the context of exemplary environment 200, operation 304 may include presenting the identifying information and/or the complementary information, and one or more of the computers 204 may present the identifying information and/or the complementary information. In one specific example of presenting the identifying information and/or the complementary information, one or more of the computers 204 may present (e.g., via a speaker and/or a graphical user interface) the identifying information, in this example, the spoken name "John Wayne" and the digital still image of "John Wayne." Further, one or more of the computers 204 may present (e.g., via a speaker and/or a graphical user interface) the complementary information, in this example, one or more instances of biographical information indexed in part with the name "John Wayne" and one or more digital still images indexed in part with the name "John Wayne."

Further, still continuing with the foregoing specific example of the operations 300 and 302 in the context of exemplary environment 200, in one specific example of presenting the identifying information and/or the complementary information, more information may be needed to associate more confidently the complementary information with the identifying information. To associate more confidently the complementary information with the identifying information, one or more of the computers 204 may prompt for input of additional information from, e.g., participant 202, and/or may consider together more than one search and/or search result to narrow a range of provisional associations. Continuing with the operation 302 example in the context of exemplary environment 200, describing content associated with the spoken name "John Wayne" and the digital still image of "John Wayne" as an example of "provisionally associated," in one implementation, one or more of the computers 204 may connect one or more instances of biographical information and one or more digital still images with the identifying information, that is, with the spoken name "John Wayne" and with the digital still image of "John Wayne," and query the participant 202, "Is this the person referred to" and/or "Is this the person pictured?" through, e.g., a graphical user interface. The participant 202 may respond as appropriate (e.g., "yes," "no," "to an 80% confidence," etc.). Thereafter, one or more of the computers 204 will be able to use the participant 202's answers in later searching, ensuring more accuracy. Continuing with the operation 302 example in the context of exemplary environment 200, describing data having some indexing at least partially formed by the name "John Wayne," one or more of the computers 204 may present a selection of instances of biographical information and thumbnail presentations of digital still images from which participant 202 may select the most appropriate to match the person referred to by the spoken name "John Wayne" included in the identifying information and the person pictured by the digital still image of "John Wayne" included in the identifying information.

Further, in the context of the exemplary environment 200, the operation 300 may include, for example, receiving identifying information, wherein the identifying information is included in a discourse, where, in a discourse in which a participant 202 is participating, one or more of the computers 204 associated with the one or more participants 202 may receive the identifying information.

In the context of the exemplary environment 200, the operation 302 may include, for example, searching for complementary information, wherein the complementary information includes information associated and/or provisionally associated with the identifying information where, in a discourse in which a participant 202 is participating, one or more of the computers 204 associated with the one or more participants 202 may search for the complementary information.

In the context of the exemplary environment 200, the operation 304 may include, for example, presenting the identifying information and/or the complementary information where, in a discourse in which a participant 202 is participating, the presenting may be performed using a visual presentation feature and/or a sonic presentation feature and/or a tactile presentation feature of one or more of the computers 204.

Figure 4B:
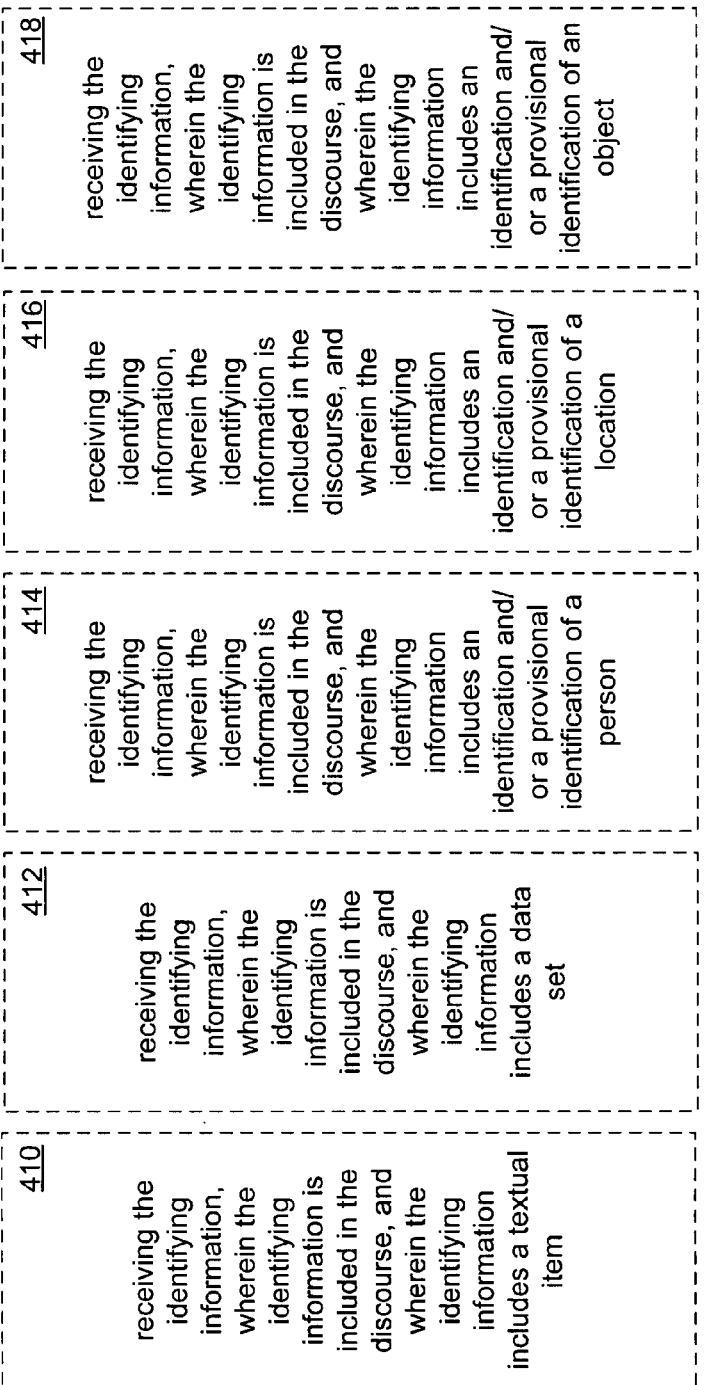
FIG. 4 depicts several alternative implementations of the high-level logic flowchart of FIG. 3.

FIG. 4 depicts several alternative implementations of the high-level logic flowchart of FIG. 3. Operation 300—receiving identifying information, wherein the identifying information is included in a discourse—may include one or more of the following operations: 400, 402, 404, 406, 408, 410, 412, 414, 416, and/or 418.

Operation 400 depicts receiving the identifying information, wherein the identifying information is included in the discourse, wherein the identifying information identifies at least a portion of a topic. Operation 400 may include, for instance, receiving the identifying information, wherein the identifying information is included in the discourse, wherein the identifying information identifies at least a portion of a topic, where the topic may include a person, such as a famous person, and/or a location, such as a city, and/or an object, such as a business entity, and where the receiving may be performed by, e.g., the computer 120 and/or one or more of the computers 204.

In the context of the exemplary environment 100, operation 400 may include, for example, receiving the identifying information, wherein the identifying information is included in the discourse, wherein the identifying information identifies at least a portion of a topic. In one specific example of the operation 400, and continuing the foregoing example of the operation 300, during a conference call participant 104 directs computer 120 to transmit to participant 102, through VoIP-enabled computer 114, identifying information including the spoken phrase "Jennifer Jones legal matters" and a digital still image of "Jennifer Jones," the identifying information identifying a topic including the legal matters of a person named Jennifer Jones.

The receiving of operation 400 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 402 shows receiving the identifying information, wherein the identifying information is included in the discourse, and wherein the identifying information includes a spoken word. Operation 402 may include, for example, receiving the identifying information, wherein the identifying information is included in the discourse, and wherein the identifying information includes a spoken word, where the spoken word may include, e.g., a word spoken by a participant 102 and/or 104 and/or 106 and/or 108 and or one or more of the participants 202, and the receiving may be performed using, e.g., the computer 120 and/or one or more of the computers 204.

In the context of the exemplary environment 100, operation 402 may include, for example, receiving the identifying information, wherein the identifying information is included in the discourse, and wherein the identifying information includes a spoken word. In one specific example of the operation 402, and continuing the foregoing example of the operation 300, during a conference call participant 104 directs computer 120 to transmit to participant 102, through VoIP-enabled computer 114, identifying information including a spoken word, "Jones," that is part of the spoken name, "Jennifer Jones."

The receiving of operation 402 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 404 depicts receiving the identifying information, wherein the identifying information is included in the discourse, and wherein the identifying information includes a photograph. Operation 404 may include, for example, receiving the identifying information, wherein the identifying information is included in the discourse, and wherein the identifying information includes a photograph, where the photograph may include a photographic image of, e.g., a person, and the photograph may be received using, e.g., the VoIP-enabled telephone unit 118.

In the context of the exemplary environment 100, operation 404 may include, for example, receiving the identifying information, wherein the identifying information is included in the discourse, and wherein the identifying information includes a photograph. In one specific example of the operation 402, and continuing the foregoing example of the operation 300, during a conference call participant 104 directs computer 120 to transmit to participant 102, through VoIP-enabled computer 114, identifying information including a photograph of the person named "Jennifer Jones." This photograph may, e.g., originate as a digital still image or may originate as an analog image (e.g., an image recorded on photographic film).

The receiving of operation 404 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 406 illustrates receiving the identifying information, wherein the identifying information is included in the discourse, and wherein the identifying information includes a video segment and/or a video frame. Operation 406 may include, for example, receiving the identifying information, wherein the identifying information is included in the discourse, and wherein the identifying information includes a video segment and/or a video frame, where the video segment may include, e.g., a 5-second segment of a video sequence of a street scene or where the video frame may include, e.g., a still frame of a video segment of a dramatic performance, and where the receiving may be performed by, e.g., the computer 124 and/or one or more of the computers 204.

In the context of the exemplary environment 100, operation 406 may include, for example, receiving the identifying information, wherein the identifying information is included in the discourse, and wherein the identifying information includes a video segment and/or a video frame. In one specific example of the operation 404, and continuing the foregoing example of the operation 300, during a conference call participant 104 directs computer 120 to transmit to participant 102, through VoIP-enabled computer 114, identifying information including a video segment and/or a video frame of the person named "Jennifer Jones" delivering a speech.

The receiving of operation 406 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 408 illustrates receiving the identifying information, wherein the identifying information is included in the discourse, and wherein the identifying information includes a graphic item. Operation 408 may include, for instance, receiving the identifying information, wherein the identifying information is included in the discourse, and wherein the identifying information includes a graphic item, where the graphic item may include, e.g., an image of a watercolor painting, and the receiving may be performed using, e.g., the computer 120.

In the context of the exemplary environment 100, operation 408 may include, for instance, receiving the identifying information, wherein the identifying information is included in the discourse, and wherein the identifying information includes a graphic item. In one specific example of the operation 408, and continuing the foregoing example of the operation 300, during a conference call participant 104 directs computer 120 to transmit to participant 102, through VoIP-enabled computer 114, identifying information including, e.g., a line drawing of the face of the person named "Jennifer Jones."

The receiving of operation 408 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 410 depicts receiving the identifying information, wherein the identifying information is included in the discourse, and wherein the identifying information includes a textual item. Operation 410 may include, for instance, receiving the identifying information, wherein the identifying information is included in the discourse, and wherein the identifying information includes a textual item, where the textual item may include, e.g., a paragraph of an email message, and the receiving may be performed using, e.g., the computer 124.

In the context of the exemplary environment 100, operation 410 may include, for instance, receiving the identifying information, wherein the identifying information is included in the discourse, and wherein the identifying information includes a textual item. In one specific example of the operation 410, and continuing the foregoing example of the operation 300, during a conference call participant 104 directs computer 120 to transmit to participant 102, through VoIP-enabled computer 114, identifying information including the name "Jennifer Jones" as text in an email.

The receiving of operation 410 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 412 shows receiving the identifying information, wherein the identifying information is included in the discourse, and wherein the identifying information includes a data set. Operation 412 may include, for example, receiving the identifying information, wherein the identifying information is included in the discourse, and wherein the identifying information includes a data set, where the data set may include, e.g., a temperature record over a period of time, and the receiving maybe performed using, e.g., the computer 120.

In the context of the exemplary environment 100, operation 412 may include, for example, receiving the identifying information, wherein the identifying information is included in the discourse, and wherein the identifying information includes a data set. In one specific example of the operation 412, and continuing the foregoing example of the operation 300, during a conference call participant 104 directs computer 120 to transmit to participant 102, through VoIP-enabled computer 114, identifying information including a list of video recordings in which the person named "Jennifer Jones" appears.

The receiving of operation 412 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 414 depicts receiving the identifying information, wherein the identifying information is included in the discourse, and wherein the identifying information includes an identification and/or a provisional identification of a person. Operation 414 may include, for instance, receiving the identifying information, wherein the identifying information is included in the discourse, and wherein the identifying information includes an identification and/or a provisional identification of a person, where the identification and/or the provisional identification of a person may include, e.g., a name and/or a nickname and/or an alphanumeric identifier and/or a role for a person, and the receiving may be performed using, e.g., one or more of the computers 204.

In the context of the exemplary environment 100, operation 414 may include, for instance, receiving the identifying information, wherein the identifying information is included in the discourse, and wherein the identifying information includes an identification and/or a provisional identification of a person. In one specific example of the operation 414, and continuing the foregoing example of the operation 300, during a conference call participant 104 directs computer 120 to transmit to participant 102, through VoIP-enabled computer 114, identifying information including the spoken name "Jennifer Jacqueline Jones" (the full birth name of the person named "Jennifer Jones").

The receiving of operation 414 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 416 illustrates receiving the identifying information, wherein the identifying information is included in the discourse, and wherein the identifying information includes an identification and/or a provisional identification of a location. Operation 416 may include, for example, receiving the identifying information, wherein the identifying information is included in the discourse, and wherein the identifying information includes an identification and/or a provisional identification of a location, where the identification and/or the provisional identification of a location may include, e.g., a name and/or a nickname and/or geographical coordinates of the location, and the receiving may be performed using, e.g., the VoIP-enabled computer 114.

In the context of the exemplary environment 100, operation 416 may include, for example, receiving the identifying information, wherein the identifying information is included in the discourse, and wherein the identifying information includes an identification and/or a provisional identification of a location. In one specific example of the operation 416, and continuing the foregoing example of the operation 300, during a conference call participant 104 directs computer 120 to transmit to participant 102, through VoIP-enabled computer 114, identifying information including a textual reference to "Los Angeles International Airport" in an email.

The receiving of operation 416 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 418 shows receiving the identifying information, wherein the identifying information is included in the discourse, and wherein the identifying information includes an identification and/or a provisional identification of an object. Operation 418 may include, for instance, receiving the identifying information, wherein the identifying information is included in the discourse, and wherein the identifying information includes an identification and/or a provisional identification of an object, where the identification and/or the provisional identification of an object may include, e.g., a name and/or a nickname and/or an alphanumeric identifier of the object, and the receiving may be performed using, e.g., the telephone 122.

In the context of the exemplary environment 100, operation 418 may include, for instance, receiving the identifying information, wherein the identifying information is included in the discourse, and wherein the identifying information includes an identification and/or a provisional identification of an object. In one specific example of the operation 418, and continuing the foregoing example of the operation 300, during a conference call participant 104 directs computer 120 to transmit to participant 102, through VoIP-enabled computer 114, identifying information including the spoken name of a boat, the "Jennifer Jones."

The receiving of operation 418 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 4, the following specific examples pertain to operations 400, 402, 404, 406, 408, 410, 412, 414, 416, and 418 in the context of exemplary environment 200 (illustrated in FIG. 2).

Continuing the foregoing example of the operation 300 in the context of exemplary environment 200, in one specific example of the operation 400, where the operation 400 may include receiving the identifying information, wherein the identifying information is included in the discourse, wherein the identifying information identifies at least a portion of a topic, one or more of the computers 204 receive from participant 202, via various input devices, identifying information including the spoken name "John Wayne" and a digital still image of "John Wayne," the identifying information identifying a topic including a person, "John Wayne."

Continuing the foregoing example of the operation 300 in the context of exemplary environment 200, in one specific example of the operation 402, where the operation 402 may include receiving the identifying information, wherein the identifying information is included in the discourse, and wherein the identifying information includes a spoken word, one or more of the computers 204 receive from participant 202, via various input devices, identifying information including a spoken word, "John" that is part of the spoken name, "John Wayne."

Continuing the foregoing example of the operation 300 in the context of exemplary environment 200, in one specific example of the operation 404, where the operation 404 may include receiving the identifying information, wherein the identifying information is included in the discourse, and wherein the identifying information includes a photograph, one or more of the computers 204 receives from participant 202, via various input devices, identifying information including a photograph of "John Wayne." This photograph may, e.g., originate as a digital still image or may originate as an analog image (e.g., an image recorded on photographic film).

Continuing the foregoing example of the operation 300 in the context of exemplary environment 200, in one specific example of the operation 406, where the operation 406 may include receiving the identifying information, wherein the identifying information is included in the discourse, and wherein the identifying information includes a video segment and/or a video frame, one or more of the computers 204 receive from participant 202, via various input devices, identifying information including a video segment and/or a video frame of "John Wayne" performing in a motion picture.

Continuing the foregoing example of the operation 300 in the context of exemplary environment 200, in one specific example of the operation 408, where the operation 408 may include receiving the identifying information, wherein the identifying information is included in the discourse, and wherein the identifying information includes a graphic item, one or more of the computers 204 receives from participant 202, via various input devices, identifying information including a business logo including an image of the face of "John Wayne."

Continuing the foregoing example of the operation 300 in the context of exemplary environment 200, in one specific example of the operation 410, where the operation 410 may include receiving the identifying information, wherein the identifying information is included in the discourse, and wherein the identifying information includes a textual item, one or more of the computers 204 receives from participant 202, via various input devices, identifying information including the name "Jennifer Jones" as text in an email.

Continuing the foregoing example of the operation 300 in the context of exemplary environment 200, in one specific example of the operation 412, where the operation 412 may include receiving the identifying information, wherein the identifying information is included in the discourse, and wherein the identifying information includes a data set, one or more of the computers 204 receive from participant 202, via various input devices, identifying information including a list of motion pictures in which "John Wayne" appears.

Continuing the foregoing example of the operation 300 in the context of exemplary environment 200, in one specific example of the operation 414, where the operation 414 may include receiving the identifying information, wherein the identifying information is included in the discourse, and wherein the identifying information includes an identification and/or a provisional identification of a person, one or more of the computers 204 receive from participant 202, via various input devices, identifying information including the spoken nickname "Duke" (a nickname for the actor John Wayne).

Continuing the foregoing example of the operation 300 in the context of exemplary environment 200, in one specific example of the operation 416, where the operation 416 may include receiving the identifying information, wherein the identifying information is included in the discourse, and wherein the identifying information includes an identification and/or a provisional identification of a location, one or more of the computers 204 receive from participant 202, via various input devices, identifying information including a reference in an email to "John Wayne Airport."

Continuing the foregoing example of the operation 300 in the context of exemplary environment 200, in one specific example of the operation 418, where the operation 418 may include receiving the identifying information, wherein the identifying information is included in the discourse, and wherein the identifying information includes an identification and/or a provisional identification of an object, one or more of the computers 204 receive from participant 202, via various input devices, identifying information including a reference to a building, the "John Wayne Building."

Further, in the context of the exemplary environment 200, the operation 400 may include, for example, receiving the identifying information, wherein the identifying information is included in the discourse, wherein the identifying information identifies at least a portion of a topic, where, in a discourse in which a participant 202 is participating, the receiving may be performed using, e.g., one or more of the computers 204.

In the context of the exemplary environment 200, the operation 402 may include, for example, receiving the identifying information, wherein the identifying information is included in the discourse, and wherein the identifying information includes a spoken word, where, in a discourse in which a participant 202 is participating, the spoken word may include a word spoken live by one or more of the participants 202 (e.g., as part of a real-time discourse) and/or part of a recorded discourse (e.g., as part of a played-back tape recording), and where the receiving may be performed using, e.g., one or more of the computers 204.

In the context of the exemplary environment 200, the operation 404 may include, for example, receiving the identifying information, wherein the identifying information is included in the discourse, and wherein the identifying information includes a photograph, where, in a discourse in which a participant 202 is participating, the photograph may include, e.g., a photographic image of a building, and the receiving may be performed using, e.g., one or more of the computers 204.

In the context of the exemplary environment 200, the operation 406 may include, for example, receiving the identifying information, wherein the identifying information is included in the discourse, and wherein the identifying information includes a video segment and/or a video frame, where, in a discourse in which a participant 202 is participating, the video segment may include, e.g., a 1-minute segment of a live video transmission of a meeting or the video frame may include, e.g., a still frame of a video recording of a dramatic performance, and where the receiving may be performed using, e.g., one or more of the computers 204.

In the context of the exemplary environment 200, the operation 408 may include, for instance, receiving the identifying information, wherein the identifying information is included in the discourse, and wherein the identifying information includes a graphic item, where, in a discourse in which a participant 202 is participating, the graphic item may include, e.g., a map, and the receiving may be performed using, e.g., one or more of the computers 204.

In the context of the exemplary environment 200, the operation 410 may include, for instance, receiving the identifying information, wherein the identifying information is included in the discourse, and wherein the identifying information includes a textual item, where, in a discourse in which a participant 202 is participating, the textual item may include, e.g., a word in an email message and the receiving may be performed using, e.g., one or more of the computers 204.

In the context of the exemplary environment 200, the operation 412 may include, for example, receiving the identifying information, wherein the identifying information is included in the discourse, and wherein the identifying information includes a data set, where, in a discourse in which a participant 202 is participating, the data set may include, e.g., medical information, and the receiving may be performed using, e.g., one or more of the computers 204.

In the context of the exemplary environment 200, the operation 414 may include, for instance, receiving the identifying information, wherein the identifying information is included in the discourse, and wherein the identifying information includes an identification and/or a provisional identification of a person, where, in a discourse in which a participant 202 is participating, the identification and/or the provisional identification of a person may include, e.g., a name and/or a nickname and/or an alphanumeric identifier and/or a role for a person, and the receiving may be performed using, e.g., one or more of the computers 204.

In the context of the exemplary environment 200, the operation 416 may include, for example, receiving the identifying information, wherein the identifying information is included in the discourse, and wherein the identifying information includes an identification and/or a provisional identification of a location, where, in a discourse in which a participant 202 is participating, the identification and/or the provisional identification of a location may include, e.g., a name and/or a nickname and/or geographical coordinates of the location, and the receiving may be performed using, e.g., one or more of the computers 204.

In the context of the exemplary environment 200, the operation 418 may include, for instance, receiving the identifying information, wherein the identifying information is included in the discourse, and wherein the identifying information includes an identification and/or a provisional identification of an object, where, in a discourse in which a participant 202 is participating, the identification and/or the provisional identification of an object may include, e.g., a name and/or a nickname and/or an alphanumeric identifier of the object, and the receiving may be performed using, e.g., one or more of the computers 204.

FIG. 5 illustrates several alternative implementations of the high-level logic flowchart of FIG. 3. Operation 302—searching for complementary information, wherein the complementary information includes information associated and/or provisionally associated with the identifying information—may include one or more of the following operations: 500, 502, 504, 506, 508, 510, 512, 514, and/or 516.

Operation 500 shows searching for the complementary information, wherein the complementary information is associated and/or provisionally associated with the identifying information, and wherein the searching includes receiving the complementary information. Operation 500 may include, for example, searching for the complementary information, wherein the complementary information is associated and/or provisionally associated with the identifying information, and wherein the searching includes receiving the complementary information, where the receiving may be performed by, e.g., the computer 120. For instance, the participant 106 may say identifying information including the name of a person, and the searching of operation 500 may include, using the computer 120, receiving complementary information including a video clip that is associated with the person whose name is spoken because it depicts that person and/or is provisionally associated with the person whose name is spoken because it depicts an event that records indicate the person participated in and who may be depicted in the video clip. More information may be required to more confidently associate the complementary information with the identifying information. To associate more confidently the complementary information with the identifying information, hardware/software/firmware associated with and/or operably coupled to, e.g., the computer 120 of this example may prompt for input of additional information from, e.g., a participant 106, and/or may correlate more than one search and/or their results to narrow a range of provisional associations.

In the context of the exemplary environment 100, operation 500 may include, for example, searching for the complementary information, wherein the complementary information is associated and/or provisionally associated with the identifying information, and wherein the searching includes receiving the complementary information. In one specific example of the operation 500, and continuing the foregoing example of the operation 302, in one specific example of searching for such complementary information that is associated with the identifying information, wherein the searching includes receiving the complementary information, VoIP-enabled computer 114 receives data indexed by the name of "Jennifer Jones," such as a still digital image indexed by the name "Jennifer Jones." In one specific example of searching for information provisionally associated with the name "Jennifer Jones," wherein the searching includes receiving the complementary information, VoIP-enabled computer 114 receives data having an attenuated/diluted/noisy linkage with the name "Jennifer Jones." For example, VoIP-enabled computer 114 receives from a data store of articles having some content associated with the name "Jennifer Jones" (e.g., a digital still image in an article in which Jennifer Jones's name is mentioned in the caption for the digital still image) such as images having respective indices such as "Jennifer Jones of Dallas," "Jennifer Jones of Paris," "Jennifer Jones of London," etc.

The searching of operation 500 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 502 illustrates searching for the complementary information, wherein the complementary information includes information that is associated and/or provisionally associated with the identifying information, and wherein the searching includes searching a private resource. Operation 502 may include, for instance, searching for the complementary information, wherein the complementary information includes information that is associated and/or provisionally associated with the identifying information, and wherein the searching includes searching a private resource, where the private resource may include, e.g., a database accessible only by permission of the maintainer and/or controller of the database, and where the searching may be performed by, e.g., the computer 120.

In the context of the exemplary environment 100, operation 502 may include, for instance, searching for the complementary information, wherein the complementary information includes information that is associated and/or provisionally associated with the identifying information, and wherein the searching includes searching a private resource. In one specific example of the operation 502, and continuing the foregoing example of the operation 302, in one specific example of searching for the complementary information that is associated and/or provisionally associated with the identifying information, where the searching includes searching a private resource, VoIP-enabled computer 114 searches a data store that is maintained and/or controlled by an entity that allows access only by employees of a specific business entity, e.g., that business entity for which participant 102 works.

The searching of operation 502 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 504 depicts searching for the complementary information, wherein the complementary information includes information that is associated and/or provisionally associated with the identifying information, and wherein the searching includes searching a public resource. Operation 504 may include, for instance, searching for the complementary information, wherein the complementary information includes information that is associated and/or provisionally associated with the identifying information, and wherein the searching includes searching a public resource, where the public resource may include, e.g., a publicly accessible database and the searching maybe performed using, e.g., one or more of the computers 204.

In the context of the exemplary environment 100, operation 504 may include, for instance, searching for the complementary information, wherein the complementary information includes information that is associated and/or provisionally associated with the identifying information, and wherein the searching includes searching a public resource. In one specific example of the operation 504, and continuing the foregoing example of the operation 302, in one specific example of searching for the complementary information that is associated and/or provisionally associated with the identifying information, where the searching includes searching a public resource, VoIP-enabled computer 114 searches a data store that is maintained and/or controlled by an entity that permits by members of the public for free or in return for payment of a fee or subscription, such as a publicly-accessible weblog.

The searching of operation 504 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 506 illustrates searching for the complementary information, wherein the complementary information includes information that is associated and/or provisionally associated with the identifying information, and wherein the complementary information includes a spoken word. Operation 506 may include, for instance, searching for the complementary information, wherein the complementary information includes information that is associated and/or provisionally associated with the identifying information, and wherein the complementary information includes a spoken word, where the spoken word may include, e.g., a recorded spoken word archived in a database, and where the searching may be performed using, e.g., the computer 124. For example, the identifying information may include a photograph of a person and the computer 124 may perform the searching of operation 506 to locate the complementary information, including a spoken word that is part of a speech that is associated with the person in the photograph (where, e.g., a speech is indexed at least in part using a photograph of the speaker and the photograph used to index the speech pictures the same person as the person pictured in the photograph included in the identifying information), and/or is provisionally associated with the person in the photograph (where, e.g., a speech is indexed at least in part using a photograph of the speaker and the photograph used to index the speech pictures a person who resembles the person pictured in the photograph included in the identifying information), and further information may be required to more confidently associate the complementary information with the identifying information. To associate more confidently the complementary information with the identifying information, hardware/software/firmware associated with and/or operably coupled to, e.g., the computer 124 of this example may prompt for input of additional information from, e.g., a participant 108, and/or may correlate more than one search and/or their results to narrow a range of provisional associations.

In the context of the exemplary environment 100, operation 506 may include, for instance, searching for the complementary information, wherein the complementary information includes information that is associated and/or provisionally associated with the identifying information, and wherein the complementary information includes a spoken word. In one specific example of the operation 506, and continuing the foregoing example of the operation 302, in one specific example of searching for the complementary information that is associated and/or provisionally associated with the identifying information, VoIP-enabled computer 114 searches for complementary information including an audio file of a speech, where the audio file is indexed with the name "Jennifer Jones" and includes an audio recording of a speech made by the person named "Jennifer Jones."

The searching of operation 506 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 508 depicts searching for the complementary information, wherein the complementary information includes information that is associated and/or provisionally associated with the identifying information, and wherein the complementary information includes a photograph. Operation 508 may include, for example, searching for the complementary information, wherein the complementary information includes information that is associated and/or provisionally associated with the identifying information, and wherein the complementary information includes a photograph, where the photograph may include a photographic image of, e.g., a person, and the searching may be performed using, one or more of the computers 204. For example, a participant 202 may receive an email including identifying information concerning a person discussed in the text of the email, e.g., a text description of the person and her job responsibilities, and the searching of operation 508 may search for complementary information including a photographic image of the person that is associated with the identifying information because, e.g., the text description of the person and her job responsibilities is unique and/or is provisionally associated with the identifying information because, e.g., the number of people whose photographs are available for the searching includes more than one for whom the subject of the photographs match the search criteria. Further information may be required to more confidently associate the complementary information with the identifying information. To associate more confidently the complementary information with the identifying information, hardware/software/firmware associated with and/or operably coupled to, e.g., one or more of the computers 204 of this example may prompt for input of additional information from, e.g., a participant 202, and/or may correlate more than one search and/or their results to narrow a range of provisional associations.

In the context of the exemplary environment 100, operation 508 may include, for example, searching for the complementary information, wherein the complementary information includes information that is associated and/or provisionally associated with the identifying information, and wherein the complementary information includes a photograph. In one specific example of the operation 508, and continuing the foregoing example of the operation 302, in one specific example of searching for the complementary information that is associated and/or provisionally associated with the identifying information, VoIP-enabled computer 114 searches for complementary information includes a digital still image that is indexed with the name "Jennifer Jones" and includes an image of the person named Jennifer Jones. This digital still image may originate as, e.g., a digital image or as an analog image on photographic film.

The searching of operation 508 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 510 shows searching for the complementary information, wherein the complementary information includes information that is associated and/or provisionally associated with the identifying information, and wherein the complementary information includes a video segment and/or a video frame. Operation 510 may include, for example, searching for the complementary information, wherein the complementary information includes information that is associated and/or provisionally associated with the identifying information, and wherein the complementary information includes a video segment and/or a video frame, where the video segment may include, e.g., a one-minute video segment of a video recording of a meeting or the video frame may include a still frame of a video recording of a movie, and the searching may be performed using, e.g., one or more of the computers 204.

In the context of the exemplary environment 100, operation 510 may include, for example, searching for the complementary information, wherein the complementary information includes information that is associated and/or provisionally associated with the identifying information, and wherein the complementary information includes a video segment and/or a video frame, where, in a discourse in which participants 102 and/or 104 and/or 106 and/or 108 are participating, the video segment may include, e.g., a five-minute video segment of a video recording of a dramatic performance or the video frame may include a still frame of a video recording of a security camera recording, and the searching may be performed using, e.g., the computer 120. For instance, a participant 104 may receive identifying information including a name of a person and a description of an act, e.g., jaywalking, where the identifying information is included in a spoken dialogue in an audio recording, and the searching of operation 510 includes using the computer 120 to search for complementary information including a video segment and/or a video frame associated with the identifying information (e.g., depicting the person jaywalking) and/or provisionally associated with the identifying information (e.g., depicting a person who has the name of the person of interest and is jaywalking. More information may be required to more confidently associate the complementary information with the identifying information). To associate more confidently the complementary information with the identifying information, hardware/software/firmware associated with and/or operably coupled to, e.g., the computer 120 of this example may prompt for input of additional information from, e.g., a participant 104, and/or may correlate more than one search and/or their results to narrow a range of provisional associations.

In the context of the exemplary environment 100, the operation 510 may include, for example, searching for the complementary information, wherein the complementary information includes information that is associated and/or provisionally associated with the identifying information, and wherein the complementary information includes a video segment and/or a video frame. In one specific example of the operation 510, and continuing the foregoing example of the operation 302, in one specific example of searching for the complementary information that is associated and/or provisionally associated with the identifying information, VoIP-enabled computer 114 searches for complementary information including a video segment and/or a video frame that is indexed with the name "Jennifer Jones" and includes one or more images of the person named "Jennifer Jones."

The searching of operation 510 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 512 illustrates searching for the complementary information, wherein the complementary information includes information that is associated and/or provisionally associated with the identifying information, and wherein the complementary information includes a graphic item. Operation 512 may include, for instance, searching for the complementary information, wherein the complementary information includes information that is associated and/or provisionally associated with the identifying information, and wherein the complementary information includes a graphic item, where the graphic item may include, e.g., a graphic image of a text document, and the searching may be performed using, e.g., the computer 124. For example, the computer 124 may receive identifying information including a text document that includes a name of a company and a word trademark of the company, and the searching of operation 512 may include searching for complementary information including a graphic image of a trademark including a logo that is associated with the identifying information (e.g., because a company identified by the identifying information owns only the word trademark and the logo trademark) and/or is provisionally associated with the identifying information (e.g., because many logo trademarks include the words of the word trademark. More information may be needed to more confidently associate the complementary information with the identifying information). To associate more confidently the complementary information with the identifying information, hardware/software/firmware associated with and/or operably coupled to, e.g., the computer 124 of this example may prompt for input of additional information from, e.g., a participant 108, and/or may correlate more than one search and/or their results to narrow a range of provisional associations.

In the context of the exemplary environment 100, operation 512 may include, for instance, searching for the complementary information, wherein the complementary information includes information that is associated and/or provisionally associated with the identifying information, and wherein the complementary information includes a graphic item. In one specific example of the operation 512, and continuing the foregoing example of the operation 302, in one specific example of searching for the complementary information that is associated and/or provisionally associated with the identifying information, VoIP-enabled computer 114 searches for complementary information including a graphic item such as a line drawing of a logo including the name "Jennifer Jones."

The searching of operation 512 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 514 shows searching for the complementary information, wherein the complementary information includes information that is associated and/or provisionally associated with the identifying information, and wherein the complementary information includes a textual item. Operation 514 may include, for instance, searching for the complementary information, wherein the complementary information includes information that is associated and/or provisionally associated with the identifying information, and wherein the complementary information includes a textual item, where the textual item may include, e.g., a paragraph of a word-processing document file, and the receiving may be performed using, e.g., the computer 120. For instance, participant 104 and/or 106 may say in a conversation received in part by the computer 120 in audio form identifying information including a report title and an identifying number of a paragraph in the report, and the searching of operation 514 may include searching (using, e.g. the computer 120) for complementary information, including a paragraph from a report, that is associated with the identifying information (e.g., the report title and the identifying number of the paragraph are unique and a report paragraph included in the complementary information is the only possible paragraph matching the report title and paragraph number included in the identifying information) and/or provisionally associated with the identifying information (e.g., the report title and the identifying number of the paragraph are not unique and one or more report paragraphs included in the complementary information are possible matches for the report title and paragraph number included in the identifying information), and more information may be required to more confidently associate the complementary information with the identifying information. To associate more confidently the complementary information with the identifying information, hardware/software/firmware associated with and/or operably coupled to, e.g., the VoIP-enabled computer 114 and/or the one or more of the computers 204 of this example may prompt for input of additional information from, e.g., a participant 102 and/or 202, and/or may correlate more than one search and/or their results to narrow a range of provisional associations.

In the context of the exemplary environment 100, operation 514 may include, for instance, searching for the complementary information, wherein the complementary information includes information that is associated and/or provisionally associated with the identifying information, and wherein the complementary information includes a textual item. In one specific example of the operation 514, and continuing the foregoing example of the operation 302, in one specific example of searching for the complementary information that is associated and/or provisionally associated with the identifying information, VoIP-enabled computer 114 searches for complementary information including a textual instance of the name "Jennifer Jones" in an email.

The searching of operation 514 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 516 depicts searching for the complementary information, wherein the complementary information includes information that is associated and/or provisionally associated with the identifying information, and wherein the complementary information includes a data set. Operation 516 may include, for example, searching for the complementary information, wherein the complementary information includes information that is associated and/or provisionally associated with the identifying information, and wherein the complementary information includes a data set, where the data set may include, e.g., a rainfall record over a period of time, and the receiving maybe performed using, e.g., the computer 124. For example, the computer 124 may receive an email including identifying information that names a city and a month, and the searching of operation 516 may include searching for complementary information including climate and/or weather data for that city during that month, where the complementary information is associated with the identifying information in that the city name is unique (so that the complementary information, climate and/or weather data stored for a city with the name of the city of interest, is clearly associated with the identifying information, which includes the name of the city of interest) and/or is provisionally associated with the identifying information in that the searchable data includes climate and/or weather data for more than one city with the name of interest (so that the complementary information, climate and/or weather data stored for a city with the name of the city of interest, is provisionally associated with the identifying information, which includes the name of the city of interest). More information may be needed to more confidently associate the complementary information with the identifying information. To associate more confidently the complementary information with the identifying information, hardware/software/firmware associated with and/or operably coupled to, e.g., the computer 124 of this example may prompt for input of additional information from, e.g., a participant 108, and/or may correlate more than one search and/or their results to narrow a range of provisional associations.

In the context of the exemplary environment 100, operation 516 may include, for example, searching for the complementary information, wherein the complementary information includes information that is associated and/or provisionally associated with the identifying information, and wherein the complementary information includes a data set. In one specific example of the operation 516, and continuing the foregoing example of the operation 302, in one specific example of searching for the complementary information that is associated and/or provisionally associated with the identifying information, VoIP-enabled computer 114 searches for complementary information including a data set such as a set of biometric parameters indexed with the name "Jennifer Jones."

The searching of operation 516 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 5, the following specific examples pertain to operations 500, 502, 504, 506, 508, 510, 512, 514, and 516 in the context of exemplary environment 200 (illustrated in FIG. 2).

Continuing the foregoing example of the operation 302 in the context of exemplary environment 200, in one specific example of the operation 500, where the operation 500 may include searching for the complementary information, wherein the complementary information is associated and/or provisionally associated with the identifying information, and wherein the searching includes receiving the complementary information, one or more of the computers 204 search for the complementary information. In this example, the searching for the complementary information may include one or more of the computers 204 receiving the complementary information, such as one or more of the computers 204 receiving an instance of biographical information indexed at least in part with the name "John Wayne."

Continuing the foregoing example of the operation 302 in the context of exemplary environment 200, in one specific example of the operation 502, where the operation 502 may include searching for the complementary information, wherein the complementary information includes information that is associated and/or provisionally associated with the identifying information, and wherein the searching includes searching a private resource, one or more of the computers 204 search for the complementary information. In this example, one or more of the computers 204 search a data store that is, e.g., maintained and/or controlled by an entity that limits access to employees of a particular business entity, e.g., the business entity for which participant 202 works.

Continuing the foregoing example of the operation 302 in the context of exemplary environment 200, in one specific example of the operation 504, where the operation 504 may include searching for the complementary information, wherein the complementary information includes information that is associated and/or provisionally associated with the identifying information, and wherein the searching includes searching a public resource, one or more of the computers 204 search for the complementary information. In this example, one or more of the computers 204 search a data store that is, e.g., maintained and/or controlled by an entity that permits by members of the public for free or in return for payment of a fee or subscription.

Continuing the foregoing example of the operation 302 in the context of exemplary environment 200, in one specific example of the operation 506, where the operation 506 may include searching for the complementary information, wherein the complementary information includes information that is associated and/or provisionally associated with the identifying information, and wherein the complementary information includes a spoken word, one or more of the computers 204 search for the complementary information. In this example, one or more of the computers 204 search for complementary information including an audio file of a speech, where the audio file is indexed with the name "John Wayne" and includes an interview of the person named "John Wayne."

Continuing the foregoing example of the operation 302 in the context of exemplary environment 200, in one specific example of the operation 508, where the operation 508 may include searching for the complementary information, wherein the complementary information includes information that is associated and/or provisionally associated with the identifying information, and wherein the complementary information includes a photograph, one or more of the computers 204 search for the complementary information. In this example, one or more of the computers 204 search for complementary information including a digital still image, where the digital still image is indexed with the name "John Wayne" and includes an image of the person named John Wayne. This digital still image may originate as, e.g., a digital image or as an analog image on photographic film.

Continuing the foregoing example of the operation 302 in the context of exemplary environment 200, in one specific example of the operation 510, where the operation 510 may include searching for the complementary information, wherein the complementary information includes information that is associated and/or provisionally associated with the identifying information, and wherein the complementary information includes a video segment and/or a video frame, one or more of the computers 204 search for the complementary information. In this example, one or more of the computers 204 search for complementary information including a video segment and/or a video frame, where the video segment and/or the video frame is indexed with the name "John Wayne" and includes one or more images of the person named John Wayne.

Continuing the foregoing example of the operation 302 in the context of exemplary environment 200, in one specific example of the operation 512, where the operation 512 may include searching for the complementary information, wherein the complementary information includes information that is associated and/or provisionally associated with the identifying information, and wherein the complementary information includes a graphic item, one or more of the computers 204 search for the complementary information. In this example, one or more of the computers 204 search for complementary information including a graphic item such a logo including a stylized image of the face of John Wayne and indexed with the name "John Wayne."

Continuing the foregoing example of the operation 302 in the context of exemplary environment 200, in one specific example of the operation 514, where the operation 514 may include searching for the complementary information, wherein the complementary information includes information that is associated and/or provisionally associated with the identifying information, and wherein the complementary information includes a textual item, one or more of the computers 204 search for the complementary information. In this example, one or more of the computers 204 search for complementary information including a textual instance of the name "John Wayne" in a word-processing document.

Continuing the foregoing example of the operation 302 in the context of exemplary environment 200, in one specific example of the operation 516, where the operation 516 may include searching for the complementary information, wherein the complementary information includes information that is associated and/or provisionally associated with the identifying information, and wherein the complementary information includes a data set, one or more of the computers 204 search for the complementary information. In this example, one or more of the computers 204 search for complementary information including a data set including a list of motion pictures in which the person named "John Wayne" appears, along with lists of the casts of those motion pictures, the list of motion pictures being indexed with the name "John Wayne."

Further, in the context of the exemplary environment 200, the operation 500 may include, for example, searching for the complementary information, wherein the complementary information is associated and/or provisionally associated with the identifying information, and wherein the searching includes receiving the complementary information, where, in a discourse in which a participant 202 is participating, the receiving may be performed by, e.g., one or more of the computers 204.

In the context of the exemplary environment 200, the operation 502 may include, for instance, searching for the complementary information, wherein the complementary information includes information that is associated and/or provisionally associated with the identifying information, and wherein the searching includes searching a private resource, where, in a discourse in which a participant 202 is participating, the private resources may include, e.g., a personal database accessible only by permission, and the searching may be performed using, e.g., one or more of the computers 204.

In the context of the exemplary environment 200, the operation 504 may include, for instance, searching for the complementary information, wherein the complementary information includes information that is associated and/or provisionally associated with the identifying information, and wherein the searching includes searching a public resource, where, in a discourse in which a participant 202 is participating, the public resource may include, e.g., a publicly accessible database such as a weblog, and the searching may be performed using, e.g., one or more of the computers 204.

In the context of the exemplary environment 200, the operation 506 may include, for instance, searching for the complementary information, wherein the complementary information includes information that is associated and/or provisionally associated with the identifying information, and wherein the complementary information includes a spoken word, where, in a discourse in which a participant 202 is participating, the spoken word may include, e.g., a recorded spoken word archived in a database, and where the searching may be performed using, e.g., one or more of the computers 204.

In the context of the exemplary environment 200, the operation 508 may include, for example, searching for the complementary information, wherein the complementary information includes information that is associated and/or provisionally associated with the identifying information, and wherein the complementary information includes a photograph, where, in a discourse in which a participant 202 is participating, the photograph may include a photographic image of, e.g., a building, and the searching may be performed using, e.g., one or more of the computers 204.

In the context of the exemplary environment 200, the operation 510 may include, for example, searching for the complementary information, wherein the complementary information includes information that is associated and/or provisionally associated with the identifying information, and wherein the complementary information includes a video segment and/or a video frame, where, in a discourse in which a participant 202 is participating, the video segment may include, e.g., a one-second video segment of a video recording of a football game or the video frame may include a still frame of a video recording of a meeting, and the searching may be performed using, e.g., one or more of the computers 204.

In the context of the exemplary environment 200, the operation 512 may include, for instance, searching for the complementary information, wherein the complementary information includes information that is associated and/or provisionally associated with the identifying information, and wherein the complementary information includes a graphic item, where, in a discourse in which a participant 202 is participating, the graphic item may include, e.g., a graphic image of a technical diagram, and the searching may be performed using, e.g., one or more of the computers 204.

In the context of the exemplary environment 200, the operation 514 may include, for instance, searching for the complementary, information, wherein the complementary information includes information that is associated and/or provisionally associated with the identifying information, and wherein the complementary information includes a textual item, where, in a discourse in which a participant 202 is participating, the textual item may include a word of an email message, and the receiving my be performed using the one or more of the computers 204.

In the context of the exemplary environment 200, the operation 516 may include, for example, searching for the complementary information, wherein the complementary information includes information that is associated and/or provisionally associated with the identifying information, and wherein the complementary information includes a data set, where, in a discourse in which a participant 202 is participating, the data set may include, e.g., financial information, and the receiving may be performed using, e.g., one or more of the computers 204.

FIG. 6 shows several alternative implementations of the high-level logic flowchart of FIG. 3. Operation 304—presenting the identifying information and/or the complementary information—may include one or more of the following operations: 600 and/or 602.

Operation 600 shows presenting the identifying information using a visual presentation device and/or a sonic presentation device and/or a tactile presentation device. Operation 600 may include, for instance, presenting the identifying information using a visual presentation device and/or a sonic presentation device and/or a tactile presentation device, where the presenting may be performed using, e.g., a visual presentation device, such as a display screen of the VoIP-enabled telephone 114.

In the context of the exemplary environment 100, operation 600 may include, for instance, presenting the identifying information using a visual presentation device and/or a sonic presentation device and/or a tactile presentation device. In one specific example of the operation 600, and continuing the foregoing example of the operation 304, in one specific example of presenting the identifying information, VoIP-enabled computer 114 presents the identifying information (here including the name "Jennifer Jones") using a graphical user interface (as an example of a visual presentation device) and/or a speaker (as an example of a sonic presentation device) and/or a device shaker, e.g., as a signal that the identifying information is available (as an example of a tactile presentation device).

The presenting of operation 600 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 602 illustrates presenting the complementary information using a visual presentation device and/or a sonic presentation device and/or a tactile presentation device. Operation 602 may include, for instance, presenting the complementary information using a visual presentation device and/or a sonic presentation device and/or a tactile presentation device, where the presenting may be performed using, e.g., a tactile presentation device, such as a device shaker of the computer 120.

In the context of the exemplary environment 100, operation 602 may include, for instance, presenting the complementary information using a visual presentation device and/or a sonic presentation device and/or a tactile presentation device. In one specific example of the operation 602, and continuing the foregoing example of the operation 304, in one specific example of presenting the complementary information, VoIP-enabled computer 114 presents the complementary information (here including a data set of biometric information for the person named "Jennifer Jones") using a graphical user interface (as an example of a visual presentation device) and/or a speaker (as an example of a sonic presentation device) and/or a device shaker, e.g., as a signal that the complementary information is available (as an example of a tactile presentation device)

The presenting of operation 602 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 6, the following specific examples pertain to the operations 600 and 602 in the context of exemplary environment 200 (illustrated in FIG. 2).

Continuing the foregoing example of the operation 304 in the context of exemplary environment 200, in one specific example of the operation 600, where the operation 600 may include presenting the identifying information using a visual presentation device and/or a sonic presentation device and/or a tactile presentation device, one or more of the computers 204 present the identifying information. In this example, one or more of the computers 204 present the identifying information (here including the name "John Wayne") using a graphical user interface (as an example of a visual presentation device) and/or a speaker (as an example of a sonic presentation device) and/or a device shaker, e.g., as a signal that the identifying information is available (as an example of a tactile presentation device).

Continuing the foregoing example of the operation 304 in the context of exemplary environment 200, in one specific example of the operation 602, where the operation 602 may include presenting the complementary information using a visual presentation device and/or a sonic presentation device and/or a tactile presentation device, one or more of the computers 204 present the complementary information. In this example, one or more of the computers 204 present the complementary information (here including the name "John Wayne") using a graphical user interface (as an example of a visual presentation device) and/or a speaker (as an example of a sonic presentation device) and/or a device shaker, e.g., as a signal that the complementary information is available (as an example of a tactile presentation device).

Further, in the context of the exemplary environment 200, the operation 600 may include, for instance, presenting the identifying information using a visual presentation device and/or a sonic presentation device and/or a tactile presentation device, where, in a discourse in which a participant 202 is participating, the presenting may be performed using, e.g., a tactile presentation device, such as a device shaker (e.g., a mouse shaker) of one or more of the computers 204.

In the context of the exemplary environment 200, the operation 602 may include, for instance, presenting the complementary information using a visual presentation device and/or a sonic presentation device and/or a tactile presentation device, where, in a discourse in which a participant 202 is participating, the presenting may be performed using, e.g., a sonic presentation device, such as a speaker of one or more of the computers 204.

Figure 7:
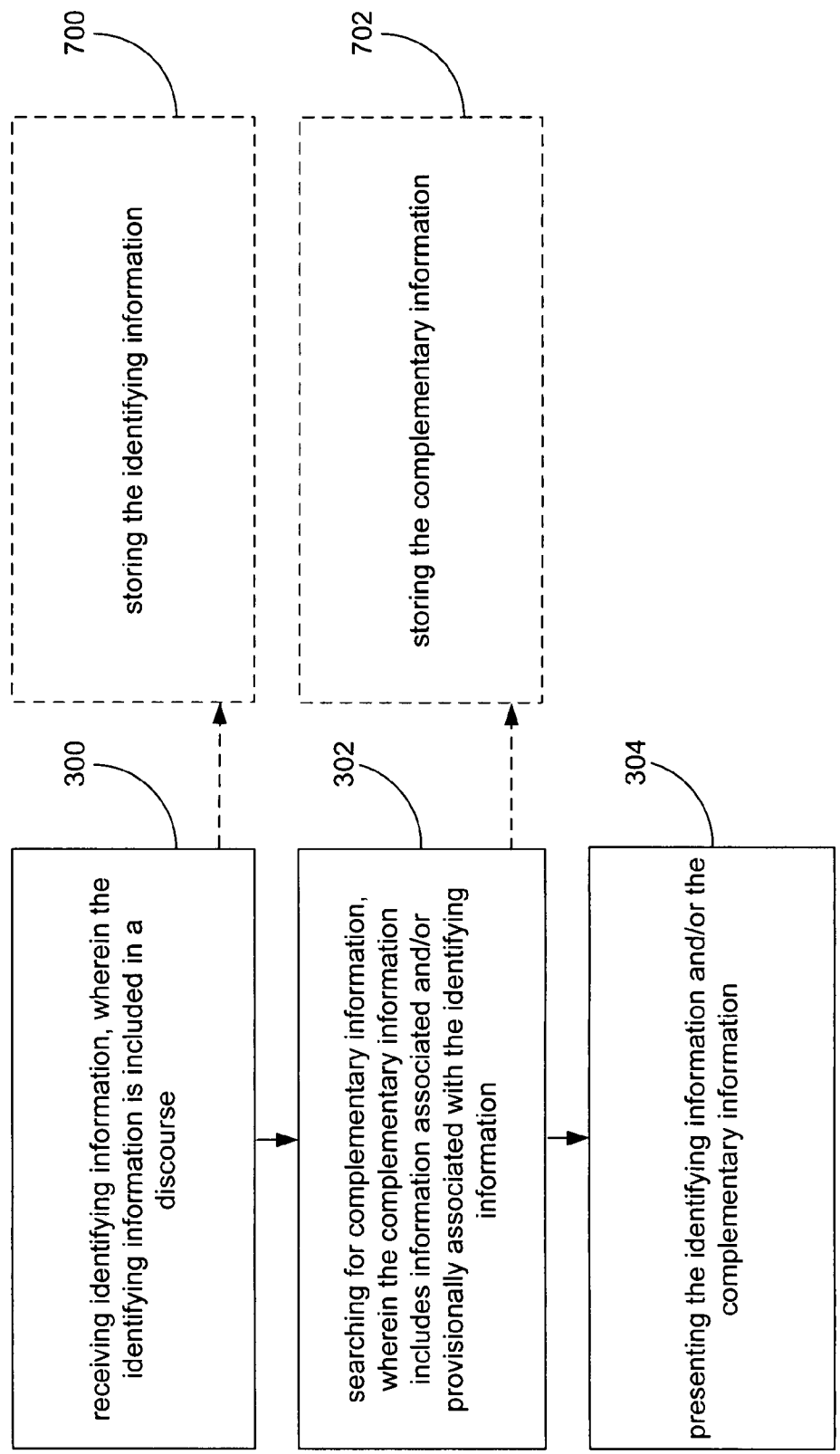
FIG. 7 shows a high-level logic flowchart of an operational process.

FIG. 7 shows a high-level logic flowchart of an operational process. The depicted process may include one or more of the following operations: 300 (described herein), 302 (described herein), 304 (described herein), 700, and/or 702.

Operation 700 shows storing the identifying information. Operation 700 may include, for example, storing the identifying information, where the storing includes storing the identifying information in a data structure, such as a Versitcard (herein, "vCard") format and the storing may be performed using, e.g., memory resources associated with and/or operably coupled to one or more of the computers 204.

In the context of the exemplary environment 100, operation 700 may include, for example, storing the identifying information. In one specific example of the operation 700, and continuing the foregoing example of the operation 300, participant 102 may use VoIP-enabled computer 114 to store the identifying information in memory resources associated with VoIP-enabled computer 114 and/or operably coupled to VoIP-enabled computer 114. VoIP-enabled computer 114 stores the identifying information (e.g., the name "Jennifer Jones") to populate a data template such as a vCard format and/or a custom-designed data structure for current and future reference. VoIP-enabled computer 114 may, for instance, present via a graphical user interface a set of fields for participant 202 to fill by entering the identifying information (e.g., the name "Jennifer Jones") in the appropriate field or fields.

The storing of operation 700 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 702 illustrates storing the complementary information. Operation 702 may include, for instance, storing the complementary information, where the storing includes storing the complementary information in a data structure such as custom-designed data structure and the storing may be performed using, e.g., memory resources associated with and/or operably coupled to the telephone 116.

In the context of the exemplary environment 100, operation 702 may include, for instance, storing the complementary information. In one specific example of the operation 702, and continuing the foregoing example of the operation 302, participant 102 may use VoIP-enabled computer 114 to store the complementary information in memory resources associated with VoIP-enabled computer 114 and/or operably coupled to VoIP-enabled computer 114. VoIP-enabled computer stores the complementary information (e.g., a digital still image for which the name "Jennifer Jones" is included in the caption) to populate a data template such as a vCard format and/or a custom-designed data structure for current and future reference. VoIP-enabled computer 114 may, for instance, present via a graphical user interface a set of field for participant 102 to fill by entering the digital still image for which the name "Jennifer Jones" is included in the caption in the appropriate field or fields.

The storing of operation 702 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 7, the following specific examples pertain to the operations 700 and 702 in the context of exemplary environment 200 (illustrated in FIG. 2).

Continuing the foregoing example of the operation 300 in the context of exemplary environment 200, in one specific example of the operation 700, where the operation 700 may include storing the identifying information, computer 204 stores the identifying information (e.g., the name "John Wayne") to populate a data template such as a vCard format and/or a custom-designed data structure for current and future reference. One or more of the computers 204 may, for instance, present via a graphical user interface a set of fields for participant 202 to fill by entering the identifying information (e.g., the name "John Wayne") in the appropriate field or fields.

Continuing the foregoing example of the operation 302 in the context of exemplary environment 200, in one specific example of the operation 702, where the operation 702 may include storing the complementary information, computer 204 stores the complementary information (e.g., a digital still image for which the name "John Wayne" is included in the caption) to populate a data template such as a vCard format and/or a custom-designed data structure for current and future reference. One or more of the computers 204 may, for instance, present via a graphical user interface a set of field for participant 202 to fill by entering the digital still image for which the name "John Wayne" is included in the caption in the appropriate field or fields.

Further, in the context of the exemplary environment 200, the operation 700 may include, for example, storing the identifying information, where, in a discourse in which a participant 202 is participating, the storing includes storing the identifying information in a data structure such as a commercially-available data structure and the storing may be performed using, e.g., memory resources associated with and/or operably coupled to one or more of the computers 204.

In the context of the exemplary environment 200, the operation 702 may include, for instance, storing the complementary information, where, in a discourse in which a participant 202 is participating, the storing includes storing the complementary information in a data structure, such as a vCard format, and the storing may be performed using, e.g., memory resources associated with and/or operably coupled to one or more of the computers 204.

Figure 8:
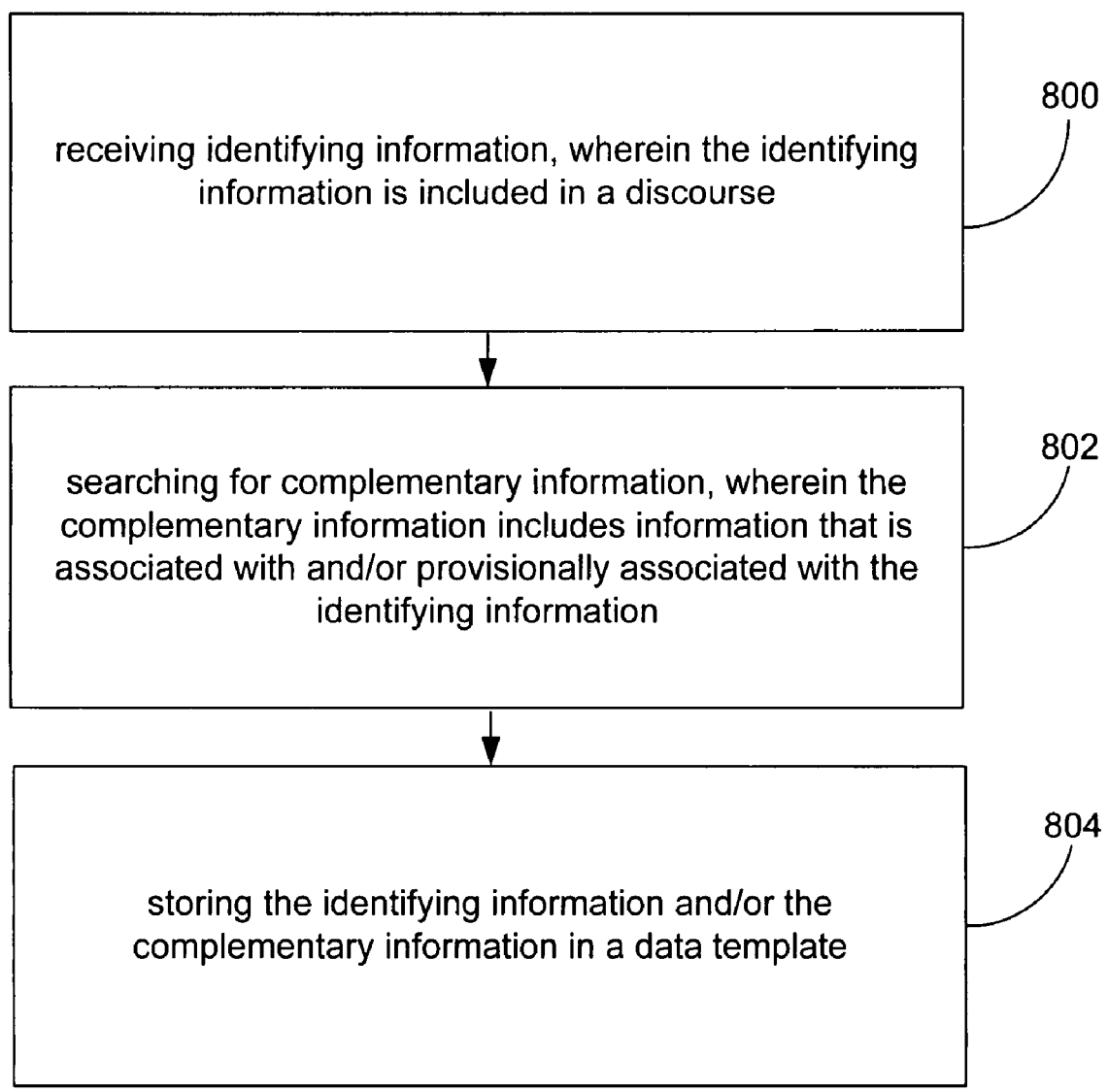
FIG. 8 shows a high-level logic flowchart of an operational process.

FIG. 8 shows a high-level logic flowchart of an operational process. The operational process depicted may include one or more of the following operations: 800, 802, and/or 804.

Operation 800 depicts receiving identifying information, wherein the identifying information is included in a discourse. Operation 800 may include, for instance, receiving identifying information, wherein the identifying information is included in a discourse, where the identifying information may include but not be limited to a spoken word (such as a name of a business entity) and/or a photograph (such as a digital still image of a building) and/or a video segment (such as a 15-second digital video segment of a video recording of a game) and/or video frame (such as a digital video still image of a person from a video segment) and/or a graphic item (such as an image of a painting) and/or a textual item (such as a word in an email or a document file) and/or a data set (such as entry and exit times from an office suite). Further, the identifying information may identify a topic, for example, a person and/or a location and/or an object.

In the context of the exemplary environment 100, operation 800 may include, for instance, receiving identifying information, wherein the identifying information is included in a discourse, where, in a discourse in which participants 102 and/or 104 and/or 106 and/or 108 are participating, the VoIP-enabled computer 114 may receive the identifying information. In one specific example of the operation 800, during a conference call participant 108 directs computer 124 to transmit to participant 102, through VoIP-enabled computer 114, a document file including the name of a person, such as "Jennifer Jones" (a specific example of the more general "identifying information"). Upon receipt of the identifying information by VoIP-enabled computer 114, participant 102 indicates to VoIP-enabled computer 114 through some means (e.g., a voice and/or graphical user interface) that participant 102 is interested in any additional information that VoIP-enabled computer 114 could supply regarding "Jennifer Jones."

The receiving of operation 800 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 802 shows searching for complementary information, wherein the complementary information includes information that is associated and/or provisionally associated with the identifying information. Operation 802 may include, for example, searching for complementary information, wherein the complementary information includes information that is associated and/or provisionally associated with the identifying information, where the complementary information may include but not be limited to a spoken word (such as a patient name) and/or a photograph (such as a digital still image of a work site) and/or a video segment (such as a 20-second digital video segment of a video recording of a chess match) and/or video frame (such as a digital video still image of a person from a video segment) and/or a graphic item (such as an image of a set of symbols) and/or a textual item (such as a word in an email or a document file) and/or a data set (such as a payment amounts).

In the context of the exemplary environment 100, operation 802 may include, for example, searching for complementary information, wherein the complementary information includes information that is associated and/or provisionally associated with the identifying information. In one example of the operation 802, and continuing the foregoing specific example of operation 800, in one specific example of searching for information associated with the name of the person in the document file (e.g., "Jennifer Jones"), VoIP-enabled computer 114 searches for data indexed by the name of "Jennifer Jones." The results of this search might be a still digital image indexed by the name "Jennifer Jones." In one specific example of searching for information provisionally associated with the name "Jennifer Jones," VoIP-enabled computer 114 searches for data having an attenuated/diluted/noisy linkage with name "Jennifer Jones." For instance, VoIP-enabled computer 114 might search for data having some content and/or indexing at least partially formed by the name "Jennifer Jones." As an example of content, VoIP-enabled computer 114 might search a data store of articles having some content associated with the name "Jennifer Jones" (e.g., a digital still image in an article in which Jennifer Jones's name is mentioned in the caption for the digital still image). As an example of data having some indexing at least partially formed by the name "Jennifer Jones," VoIP-enabled computer 114 might search a data store of images having respective indices such as "Jennifer Jones of Dallas," "Jennifer Jones of Paris," "Jennifer of London," etc.

The searching of operation 802 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Operation 804 illustrates storing the identifying information and/or the complementary information in a data template. Operation 804 may include, for example, storing the identifying information and/or the complementary information in a data template, where the presenting may be performed with, e.g., presentation features of the telephone 116, including but not limited to a visual presentation feature (e.g., a computer screen) and/or a sonic presentation feature (e.g., a speaker) and/or a tactile presentation feature (e.g., a device shaker).

In the context of the exemplary environment 100, operation 804 may include, for example, storing the identifying information and/or the complementary information in a data template. In one example of the operation 804, and continuing with the foregoing specific example of operation 802, in one specific example of storing the identifying information and/or the complementary information in a data template more information may be needed to more confidently associate the complementary information with the identifying information. To associate more confidently the complementary information with the identifying information, VoIP-enabled computer 114 may prompt for input of additional information from, e.g., a participant 102 and/or may correlate more than one search and/or search result to narrow a range of provisional associations. Continuing with the operation 802 example describing content associated with the name "Jennifer Jones" as an example of "provisionally associated" (e.g., the digital still image in the article in which the Jennifer Jones's name is mentioned in the caption for the digital still image), in one implementation VoIP-enabled computer 114 may pair the image from the article with name from the document and query participant 102 "Is this her?" (e.g., through a graphical user interface) to which participant 102 may respond as appropriate (e.g., "yes," "no," "to a confidence of 80%," etc.). Thereafter, VoIP-enabled computer 114 will be able to use participant 102's answers in subsequent searching thereby ensuring more accuracy. Continuing with the operation 802 example describing data having some indexing at least partially formed by the name "Jennifer Jones," VoIP-enabled computer 114 may present a listing of the digital still images from which participant 102 may select that most appropriate to the name "Jennifer Jones" of the document file.

In addition, the storing the identifying information and/or the complementary information in a data template of operation 804 may include, in one specific example, the VoIP-enabled computer 114 storing the identifying information, e.g., the name "Jennifer Jones," and/or the complementary information, e.g., one or more digital still images returned by the searching of the specific example of operation 802, in memory resources included in and/or operably coupled to the VoIP-enabled computer 114, in a predetermined data template such as a vCard data structure and/or in a custom-designed data structure so that the stored identifying information and/or the complementary information may be retrieved for reference.

The searching of operation 804 may be performed at least in part in response to operator input (where an operator may include, without being limited to, a person or persons and/or a software agent acting on behalf of a person or persons and/or autonomously) and/or hardware/software/firmware input via hardware/software/firmware associated with the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204, and/or performed using hardware/software/firmware associated with equipment and/or devices with which the network 110 and/or the PSTN 112 and/or the VoIP-enabled computer 114 and/or the telephone 116 and/or the VoIP-enabled telephone unit 118 and/or the computer 120 and/or the telephone 122 and/or the computer 124 and/or one or more of the computers 204 are operably coupled.

Continuing to refer to FIG. 8, the following specific examples pertain to operation 800, 802, and 804 in the context of exemplary environment 200 (illustrated in FIG. 2).

In one specific example, the operation 800 may include receiving identifying information, wherein the identifying information is included in a discourse, and one or more of the computers 204 may receive the identifying information. Participant 202 participates in a discourse including a conference call in which participant 202 provides information to one or more recipients who receive information only and do not provide information to participant 202 (e.g., a presentation by participant 202 to one or more other silent recipients). In this example, one or more of the computers 204 receive from participant 202 input via various devices identifying information, such as a signal carrying the speech of participant 202 and including a spoken name such as "John Wayne," and a signal carrying a digital still image of John Wayne. Upon receipt, participant 202 indicates to one or more of the computers 204 through some means (e.g., a voice and/or graphical user interface) that participant 202 is interested in any additional information that one or more of the computers 204 could supply regarding John Wayne, using the identifying information, for, e.g., archiving, current and/or future reference, and/or provision for present and future audiences of the discourse.

Continuing the foregoing example of the operation 800 in the context of exemplary environment 200, operation 802 may include searching for complementary information, wherein the complementary information includes information that is associated and/or provisionally associated with the identifying information, and computer 204 may search for the complementary information. In one specific example of search for the complementary information, one or more of the computers 204 search for data that is associated and/or provisionally associated with the identifying information, in this example, with the name "John Wayne" and the digital still image of John Wayne. For example, as an example of content, one or more of the computers 204 might search a data store of names, of biographical information indexed by the name or names of the subject of the biographical information, and of digital still images indexed by the name or names of people pictured in the digital still images and retrieve a biography indexed with the name "John Wayne" and one or more pictures indexed with the name "John Wayne," along with one or more images that match to some degree of confidence the digital still image of John Wayne.

In one specific example of searching for information provisionally associated with the identifying information, here, the name "John Wayne" and the digital still image of John Wayne, one or more of the computers 204 search for data having an attenuated/diluted/noisy linkage with the name "John Wayne" and with the digital still image of John Wayne. For example, one or more of the computers 204 might search a data store of names, of biographical information indexed by the name or names of the subject of the biographical information, and of digital still images indexed by the name or names of people pictures in the digital still images. As an example of data having such an attenuated/diluted/noisy linkage with the name "John Wayne," one or more of the computers 204 might search data stores having biographical information and digital still images with indices such as "John Wayne, third grade student at Nash Elementary School, "John Wayne, star of the motion picture 'Stagecoach'," "John Wayne, certified public accountant," etc.

Continuing the foregoing example of the operations 800 and 802 in the context of exemplary environment 200, in one specific example the operation 804 may include storing the identifying information and/or the complementary information in a data template, and one or more of the computers 204 may present (e.g., via a speaker and/or a graphical user interface) the identifying information, in this example, the name "John Wayne" and a digital still image of John Wayne. Further, one or more of the computers 204 may present (e.g. via a speaker and/or a graphical user interface) the complementary information, the biographical information and the digital still images indexed with the name "John Wayne."

Further, still continuing with the foregoing specific example of the operations 800 and 802 in the context of exemplary environment 200, in one specific example of the operation 804, storing the identifying information and/or the complementary information in a data template, more information may be needed to associate more confidently the complementary information with the identifying information, one or more of the computers 204 may prompt for input of additional information, e.g., participant 202, and/or may consider together more than one search and/or search result to narrow a range of provisional associations. Continuing with the operation 802 example in the context of exemplary environment 200, describing content associated with the name "John Wayne" and a digital still image of John Wayne as "provisionally associated," in one implementation, one or more of the computers 204 may connect the name "John Wayne" with one or more instances of biographical information and the digital still image of John Wayne with one or more digital still images indexed with the name "John Wayne" and query the participant 202, "Is this the person referred to?" and/or "Is this the person pictured?" through, e.g., a graphical interface. The participant 202 may respond as appropriate (e.g., "yes," "no," "to a 90% confidence," etc.). Thereafter, the one or more of the computers 204 will be able to participant 202's answers in later searching, ensuring more accuracy. Continuing with the operation 304 example in the context of exemplary environment 200, describing data having some indexing at least partially formed by the name "John Wayne," one or more of the computers 204 may present a selection of instances of biographical information and thumbnail presentations of digital still images from which participant 202 may select the most appropriate to match the biographical information to the "John Wayne" included in the identifying information and to the John Wayne pictured in the digital still image included in the identifying information.

Further, in the context of the exemplary environment 200, the operation 800 may include, for instance, receiving identifying information, wherein the identifying information is included in a discourse, where, in a discourse in which a participant 202 is participating, one or more of the computers 204 may receive the identifying information.

In the context of the exemplary environment 200, the operation 802 may include, for example, searching for complementary information, wherein the complementary information includes information that is associated and/or provisionally associated with the identifying information, where, in a discourse in which a participant 202 is participating, one or more of the computers 204 may search for the complementary information.

In the context of the exemplary environment 200, the operation 804 may include, for example, storing the identifying information and/or the complementary information in a data template, where, in a discourse in which a participant 202 is participating, the presenting may be performed using a visual presentation feature and/or a sonic presentation feature and/or a tactile presentation feature of one or more of the computers 204.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (Asics), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method related to information management, the method comprising:
   receiving identifying information, wherein the identifying information is associated with a spoken discourse between two or more participants;
   searching for non-spoken complementary information in response to a directive from one or more of the participants, wherein the complementary information includes information associated and/or provisionally associated with the identifying information, the complementary information determined to be candidates for a list of topics to be presented to the one or more participants;

presenting the identifying information and/or the complementary information in the form of the list of topics presented to the one or more participants; and responding to a selection by the one or more participants of at least one topic from the list of topics by resolving one or more provisional associations via correlating at least two search results from the searching for non-spoken complementary information to narrow a range for the provisional associations.

2. A system related to information management the system comprising:

circuitry for receiving identifying information, wherein the identifying information is associated with a spoken discourse between two or more participants;

circuitry for searching for unspoken complementary information in response to a directive from one or more of the participants, wherein the complementary information includes information associated and/or provisionally associated with the identifying information, the complementary information determined to be candidates for a list of topics to be presented to the one or more participants;

circuitry for presenting the identifying information and/or the complementary information in the form of the list of topics presented to the one or more participants; and circuitry for responding to a selection by the one or more participants of at least one topic from the list of topics by resolving one or more provisional associations via correlating at least two search results from the searching for non-spoken complementary information to narrow a range for the provisional associations.

3. A system related to information management, the system comprising:

means for receiving identifying information, wherein the identifying information is associated with a spoken discourse between two or more participants;

means for searching for unspoken complementary information in response to a directive from one or more of the participants, wherein the complementary information includes information associated and/or provisionally associated with the identifying information, the complementary information determined to be candidates for a list of topics to be presented to the one or more participants;

means for presenting the identifying information and/or the complementary information in the form of the list of topics presented to the one or more participants; and means for responding to a selection by the one or more participants of at least one topic from the list of topics by resolving one or more provisional associations via correlating at least two search results from the searching for non-spoken complementary information to narrow a range for the provisional associations.

4. A computer program product related to information management, the computer program product comprising:

computer storage media bearing computer executable instructions related to receiving identifying information, wherein the identifying information is associated with a spoken discourse between two or more participants;

one or more instructions for searching for unspoken complementary information in response to a directive from one or more of the participants, wherein the complementary information includes information associated and/or provisionally associated with the identifying information, the complementary information determined to be candidates for a list of topics to be presented to the one or more participants;

one or more instructions for presenting the identifying information and/or the complementary information in the form of the list of topics presented to the one or more participants; and one or more instructions for responding to a selection by the one or more participants of at least one topic from the list of topics by resolving one or more provisional associations via correlating at least two search results from the searching for non-spoken complementary information to narrow a range for the provisional associations.

5. The computer program product of claim 4, wherein the one or more instructions related to receiving identifying information, wherein the identifying information is included in a discourse, further comprise:

one or more instructions related to receiving the identifying information, wherein the identifying information is included in the discourse, wherein the identifying information identifies at least a portion of a topic.

6. The computer program product of claim 4, wherein the one or more instructions related to receiving identifying information, wherein the identifying information is included in a discourse, further comprise:

one or more instructions related to the identifying information, wherein the identifying information is included in the discourse, and wherein the identifying information includes a spoken word.

7. The computer program product of claim 4, wherein the one or more instructions related to receiving identifying information, wherein the identifying information is included in a discourse, further comprise:

one or more instructions related to receiving the identifying information, wherein the identifying information is included in the discourse, and wherein the identifying information includes a photograph.

8. The computer program product of claim 4, wherein the one or more instructions related to receiving identifying information, wherein the identifying information is included in a discourse, further comprise:

one or more instructions related to receiving the identifying information, wherein the identifying information is included in the discourse, and wherein the identifying information includes a video segment and/or a video frame.

9. The computer program product of claim 4, wherein the one or more instructions related to receiving identifying information, wherein the identifying information is included in a discourse, further comprise:

one or more instructions related to receiving the identifying information, wherein the identifying information is included in the discourse, and wherein the identifying information includes a graphic item.

10. The computer program product of claim 4, wherein the one or more instructions related to receiving identifying information, wherein the identifying information is included in a discourse, further comprise:

one or more instructions related to receiving the identifying information, wherein the identifying information is included in the discourse, and wherein the identifying information includes a textual item.

11. The computer program product of claim 4, wherein the one or more instructions related to receiving identifying information, wherein the identifying information is included in a discourse, further comprise:

one or more instructions related to receiving the identifying information, wherein the identifying information is included in the discourse, and wherein the identifying information includes a data set.

12. The computer program product of claim 4, wherein the one or more instructions related to receiving identifying information, wherein the identifying information is included in a discourse, further comprise:
  one or more instructions related to receiving the identifying information, wherein the identifying information is included in the discourse, and wherein the identifying information includes an identification and/or a provisional identification of a person.

13. The computer program product of claim 4, wherein the one or more instructions related to receiving identifying information, wherein the identifying information is included in a discourse, further comprise:
  one or more instructions related to receiving the identifying information, wherein the identifying information is included in the discourse, and wherein the identifying information includes an identification and/or a provisional identification of a location.

14. The computer program product of claim 4, wherein the one or more instructions related to receiving identifying information, wherein the identifying information is included in a discourse, further comprise:
  one or more instructions related to receiving the identifying information, wherein the identifying information is included in the discourse, and wherein the identifying information includes an identification and/or a provisional identification of an object.

15. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information is associated and/or provisionally associated with the identifying information, and wherein the searching includes receiving the complementary information.

16. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the searching includes searching a private resource.

17. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the searching includes searching a public resource.

18. The computer program product of claim 4, wherein the one or more instructions related to searching for complementary information, wherein the complementary information includes information associated and/or provisionally associated with the identifying information, further comprise:
  one or more instructions related to for the complementary information, wherein the complementary information includes information that is associated and/or provisionally associated with the identifying information, and wherein the complementary information includes a spoken word.

19. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the complementary information includes a photograph.

20. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the complementary information includes a video segment and/or a video frame.

21. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the complementary information includes a graphic item.

22. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the complementary information includes a textual item.

23. The computer program product of claim 4, wherein the one or more instructions related to searching for complementary information, wherein the complementary information includes information associated and/or provisionally associated with the identifying information, further comprise:
  one or more instructions related to searching for the complementary information, wherein the complementary information includes information that is associated and/or provisionally associated with the identifying information, and wherein the complementary information includes a data set.

24. The computer program product of claim 4, wherein the one or more instructions related to presenting the identifying information and/or the complementary information further comprise:
  one or more instructions related to presenting the identifying information using a visual presentation device and/or a sonic presentation device and/or a tactile presentation device.

25. The computer program product of claim 4, wherein the one or more instructions related to presenting the identifying information and/or the complementary information further comprise:
   one or more instructions related to presenting the complementary information using a visual presentation device and/or a sonic presentation device and/or a tactile presentation device.

26. The computer program product of claim 4, further comprising:
   a signal-storing medium bearing one or more instructions related to storing the identifying information.

27. The program product of claim 4, further comprising:
   a signal-storing medium bearing one or more instructions related to storing the complementary information.

* * * * *